US006651046B1

(12) United States Patent
Sato et al.

(10) Patent No.: US 6,651,046 B1
(45) Date of Patent: Nov. 18, 2003

(54) OPTIMIZING APPARATUS, OPTIMIZING METHOD, AND STORAGE MEDIUM

(75) Inventors: Makihiko Sato, Kawasaki (JP); Shunji Matsumoto, Kawasaki (JP); Yohiko Teramoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 493 days.

(21) Appl. No.: 09/660,582

(22) Filed: Sep. 12, 2000

(30) Foreign Application Priority Data

Sep. 17, 1999 (JP) .......................................... 11-264148

(51) Int. Cl.[7] .............................................. G06F 15/18
(52) U.S. Cl. ........................................................ 706/13
(58) Field of Search ........................................... 706/13

(56) References Cited

U.S. PATENT DOCUMENTS 5,222,192 A * 6/1993 Shaefer ....................... 706/13
5,255,345 A 10/1993 Shaefer ....................... 706/13
5,704,713 A * 1/1998 Kim et al. .................. 374/136
5,897,629 A 4/1999 Shinagawa et al. ........... 706/13
6,182,014 B1 * 1/2001 Kenyon et al. ................ 705/7

FOREIGN PATENT DOCUMENTS

EP 1072991 A2 1/2001
WO WO00/60539 10/2000

OTHER PUBLICATIONS

Wedelin, "Fully Automatic Scheduling Methods," printed from Internet prior to Sep. 7, 2000.
Pamela H. Vance, et al., "Airline Crew Scheduling: A New Formulation and Decomposition Algorithm", Operations Research, vol.45, No. 2, Mar.–Apr. 1997.
Erik Andersson, et al., "Crew Pairing Optimization", Or In Airline Industry, Kluwer Academic Publishers.
Dag Wedelin, "The Design of a 0–1 Integer Optimizer and Its Application in the Carmen System", Jul. 1995.
Dag Wedelin, "An Algorithm for Large Scale 0–1 Integer Programming With Application to Airline Crew Scheduling", Feb. 1993, Revised Dec. 1994.
Cynthia Barnhart, et al., "Integrated Airline Schedule Planning", Kluwer Academic Publishers.

* cited by examiner

*Primary Examiner*—George B. Davis
(74) *Attorney, Agent, or Firm*—Staas & Halsey LLP

(57) ABSTRACT

A chromosome is decoded by a decoding unit, and converted into parameters of a problem model calculation unit. In the problem model calculation unit, a controller executes a local search method unit, a GA search unit, or a stochastic search unit while suitably selecting any of them, so that a solution is generated. If a constraint violation is detected by a constraint violation determination unit during a solution generation process, an added part (a part which causes a constraint violation) is removed from a current solution by the constraint violation processing unit, and the solution generation process is continued.

15 Claims, 22 Drawing Sheets

| | |
|---|---|
| NUMBER OF FLIGHTS TO BE WORKED | 4 FLIGHTS OR LESS |
| ON-BOARD WORKING HOURS | 6 HOURS OR LESS |
| WORKING HOURS | 11HOURS OR LESS |
| PREPARATION TIME BEFORE BOARDING | 60 MINUTES |
| REARRANGEMENT TIME AFTER BOARDING | 30 MINUTES |
| TRANSIT TIME DURING THE DAY | 90 MINUTES |
| AIRPORT AT WHICH LODGING IS PROHIBITED | AIRPORT NAME SPECIFICATION |
| BASE RATIO | TOKYO 60% TO OSAKA 40% |
| BASE AIRPORT | AIRPORT NAME SPECIFICATION |
| UPPER LIMIT OF CONSECUTIVE WORK DAYS | 3 DAYS |
| FIXED PATTERN SPECIFICATION | SPECIFICATION WITH FLIGHT LIST |

FIG. 5

Ship line 1

| | |
|---|---|
| S10 | 000 |
| S11 | 001 |
| S12 | 010 |
| S13 | 011 |
| S14 | 100 |
| S15 | 101 |
| S16 | 110 |
| S17 | 111 |

FIG. 8

| SORTING ORDER | |
|---|---|
| 1 | f1 |
| 2 | f3 |
| 3 | f7 |
| 4 | f5 |
| 5 | f11 |
| 6 | f9 |

FIG. 15

70

CONNECTION FROM f2

| | | |
|---|---|---|
| $f_3$ | 0. 20 | SAME-DAY DEADHEAD → NO NEXT-DAY OPERATIONS |
| $f_5$ | 0. 30 | NEXT-DAY OPERATIONS |
| $f_5 \rightarrow f_6$ | 0. 20 | |
| $f_3 \rightarrow f_{10}$ | 0. 10 | NEXT-DAY DEADHEAD → NEXT-DAY OPERATIONS |
| $f_5 \rightarrow f_{10}$ | 0. 05 | |
| $f_9 \rightarrow f_6$ | 0. 05 | |
| $f_9 \rightarrow f_{10}$ | 0. 10 | |

( CONNECTION PROBABILITY )

FIG. 17

OPTIMIZING APPARATUS, OPTIMIZING METHOD, AND STORAGE MEDIUM

BACKGROUND OF THE INVENTION

1. Field of the Invention

The present invention relates to an optimizing apparatus, an optimizing method, and a storage medium.

2. Description of the Related Art

Optimization forms the base of an intellectual process in the use of a highly advanced computer. Its specific application fields are, for example, the scheduling problem, the vehicle allocation problem, the pattern estimation problem, the automatic timetable assignment problem, the crew positioning problem, etc. However, since a limitation is imposed on a calculation amount or a storage apparatus capacity, it is not practical to solve such large-scale optimization problems by a search of all solutions.

As computer performance has been improving, closer attention is being paid to stochastic optimization methods (simulated annealing, a GA (Genetic Algorithm), etc.) as a means for solving a problem that is difficult to be solved with a conventional expert system etc., and studies have been made to put the methods into practical use. Especially, a GA attracts a great deal of attention among various optimization methods because of its simplicity.

Furthermore, personnel scheduling is a fundamental problem in all industries. This can be understood as one of optimization problems. This problem has a critical influence on cost reduction.

For example, in an aviation field, labor costs rank second to fuel costs on a worldwide scale. A reduction in labor costs is a significant challenge.

As a normal method for solving a combinatorial problem, modeling using simultaneous equations and mathematical solution seeking, such as LP (Linear Programming) and IP (Integer Programming) methods, etc., are utilized, and a problem is solved as a set partitioning problem or a set covering problem.

With these methods, however, putting of a complicated problem into definite equations itself is difficult when the problem is solved. For a large-scale problem, a solution cannot be obtained within a practical time due to an increase in the number of definitions or combinations, even if the problem can be put into equations. Besides, a solution cannot sometimes be found even after a search is executed for many hours.

Furthermore, methods such as column generation, etc. are used to increase speed. However, a large-scale problem faces various limitations owing to issues such as a column generation time, a restriction on a memory capacity, etc.

A method which attracts keen interest as a means for solving such problems associated with conventional methods is a GA (Genetic Algorithm) With the GA, a problem is put into a model, and its parameters are represented by using a chromosome. When optimization is made with a GA, a chromosome is decoded and converted into parameters, which are then entered into the problem model. The problem model is evaluated, and its evaluation value is used as a fitness of the chromosome, so that an individual (chromosome) is evolved and optimization is advanced.

Issues in conventional methods are listed below.

1. Issues in a Problem Description

With IP/LP, the problem description must be represented in a matrix form, and it is difficult to reflect the details of each condition with this method.

With some problem-solving methods using column generation, the problem is represented as a set of rules, and the details of the problem are described as generation rules at the time of column generation. However, there are various issues such as how to represent the problem by rules, how to verify coverage or appropriateness of rules, how to maintain consistency of rules, etc.

2. Issues in a Search Method

Even with a GA, which has advantages that are not implemented by conventional methods, its solution-seeking capability has the following limitations if a solution space becomes extremely large.

1) A GA chromosome cannot cover an entire solution space.

2) If coding is performed to cover an entire solution space, the number of areas, as such as the one causing a constraint violation or the one that is unsuitable as a solution, significantly increases. Therefore, optimization cannot efficiently be made.

3) Solution generation with solution generation rules is desirable in some cases. However, if a solution is generated by simply using the rules, a solution-seeking method becomes inflexible, so that a solution of high quality cannot be obtained.

3. Issues in a Scheduling Time Period and Operation Regularity

An actual target to be scheduled can be a rather complicated issue, such as whether a particular operation is to be or not to be performed depending on a day. With conventional methods, it is difficult to directly handle such a target. Therefore, the conventional techniques implicitly assume that the same operation is repeated for consecutive days, and draw up a schedule covering several days. This is referred to as a daily model.

Since operations to be scheduled become increasingly irregular hereafter, a solution to a daily model, etc., becomes increasingly unsuitable to the current status.

Also, as in the case of a flight crew schedule in the United States (US), a schedule such that some operations are not performed on weekends may be considered. This is referred to as a weekly model.

Furthermore, a schedule such that all of irregular schedule targets are included, and its time period is approximately 1 to 2 months is referred to as a fully dated model. An example of directly handling this model is not known.

SUMMARY OF THE INVENTION

An object of the present invention is to implement an optimizing apparatus, an optimizing method, and a storage medium, which can automatically generate a solution to a constraint satisfying an optimization problem that cannot conventionally be solved, and has not only an extensive search space but also many constraints conditions, such as a fully dated model.

An optimizing apparatus according to the present invention comprises the following units.

A solution-seeking data presenting unit outputs solution-seeking data to a problem model, and advances optimization of the solution-seeking data by receiving an evaluation value of a solution resultant from applying the solution-seeking data to the problem model.

A solution seeking unit obtains a solution-seeking starting point of a solution to the problem model from the solution-seeking data received from the solution-seeking data presenting unit, and seeks a solution to the problem model by using at least both a local search method and a stochastic search method.

An evaluation value calculating unit calculates an evaluation value of the solution sought by the solution seeking unit, and outputs the calculated value to the solution-seeking data presenting unit.

A solution obtaining unit obtains a final solution to the problem model by controlling the solution-seeking data presenting unit, the solution seeking unit, and the evaluation value calculating unit.

With the optimizing apparatus having the above described configuration, a search starting point in a solution space (search space) is globally determined according to the solution-seeking data, and the search space is restricted. Next, a solution is searched locally or stochastically from the search starting point (solution-seeking starting point) with local search and stochastic search methods. Therefore, according to the present invention, a search method is modified so that a search space can efficiently be searched in a large-scale problem. As a result, it becomes possible to obtain a solution to a complicated constraint satisfying optimization problem that cannot conventionally be solved, and has an extremely large search space and many constraint conditions, such as a fully dated model. Additionally, a solution can be obtained by a fewer number of search times than that of a conventional apparatus, thereby making a solution seeking time shorter than that of the conventional apparatus.

The solution-seeking data presenting unit represents solution-seeking data, for example, as a chromosome, and receives an evaluation value as a fitness of the chromosome, and advances the optimization of the solution-seeking data while evolving the chromosome with a genetic algorithm. In such a configuration, the solution seeking unit determines a solution-seeking starting point of a solution to a problem model by using a first probability table (such as a segmentation probability table to be described later, etc.) storing the information for stochastically determining the solution-seeking starting point, for example, when decoding a first gene of the chromosome. Furthermore, the solution seeking unit advances the solution seeking by decoding, for example, a second gene of the chromosome.

The solution seeking unit comprises a second probability table storing the information for stochastically determining the next search point, and advances the solution-seeking with a stochastic search method while using the second probability table (such as a segment connection probability table to be described later, etc.).

The problem model is, for example, a model of a constraint satisfying optimization problem seeking a solution of a second schedule over a plurality of days, which is obtained by linking a plurality of first schedules each composed of a sequence of operations in certain units for each day. The solution seeking starting point is an operation that is started at the beginning of the second schedule.

In such a configuration, the operations are, for example, on-board operations of a flight crew. In this case, the first schedule is a crew pattern on one day, and the second schedule is a crew pattern over a plurality of days. In such a case, the local search method is used to search for a connecting flight that can be operated on days except for those on which an irregular flight is in service. The stochastic search method is used to search for the next connecting flight.

The solution seeking unit generates a crew pattern by partitioning a ship line into segments based on the solution-seeking data, and by connecting the partitioned segments. The partitioning of the segments is made, for example, by using a segmentation probability table which is arranged for each ship line and stores the method partitioning each ship line.

Additionally, the connection of the partitioned segments is made, for example, by a stochastic search using a segment connection probability table which is arranged for each flight and stores connection probability information of flights to be connected to each flight.

The solution-seeking data is given as a chromosome obtained with a genetic algorithm. In this case, the solution-seeking data presenting unit evolves the chromosome with a genetic algorithm. The solution seeking unit generates a crew pattern by using the chromosome. The evaluation value calculating unit calculates the evaluation value of the crew pattern generated by the solution seeking unit as a fitness of the chromosome.

According to another preferred embodiment in the case where the solution-seeking data is given as a chromosome obtained with a genetic algorithm, a solution seeking unit generates a crew pattern by partitioning each ship line into segments with a first gene of the chromosome, and a segmentation probability table which is arranged for each ship line and stores the information for stochastically determining a partitioning method of each ship line, and by connecting the partitioned segments.

In such a preferred embodiment, the solution seeking unit stochastically searches for a segment to be connected next by using a second gene of the chromosome, and a segment connection probability table which is arranged for each flight and stores a connection probability value of a flight to be connected to each flight.

An optimizing method obtaining a final solution to a problem model according to the present invention comprises: outputting solution-seeking data to a problem model, and advancing optimization of the solution-seeking data by receiving an evaluation value of a solution obtained by applying the solution-seeking data to the problem model; obtaining a solution-seeking starting point of a solution to the problem model from the solution-seeking data, and seeking the solution to the problem model by using at least both of a local search method and a stochastic search method; and calculating an evaluation value of the obtained solution, and using the calculated evaluation value to advance optimization of the solution-seeking data.

A computer-readable storage medium obtaining a final solution to a problem mode according to the present invention, on which is recorded a program for causing a computer to execute a process, said process comprising: outputting solution-seeking data to a problem model, and advancing optimization of the solution-seeking data by receiving an evaluation value of a solution obtained by applying the solution-seeking data to the problem model; obtaining a solution seeking-starting point of a solution to the problem model, and seeking the solution to the problem model by using at least both of a local search method and a stochastic search method; and calculating an evaluation value of the obtained solution, and using the calculated evaluation value to advance optimization of the solution-seeking point.

BRIEF DESCRIPTION OF THE DRAWINGS

FIG. 5 exemplifies constraint conditions used in the preferred embodiment;

FIG. 8 shows the structure of data representing 8 types of segmentation of the ship line 1 shown in FIG. 6;

FIG. 15 shows a sorting result of the first flights of segments obtained by decoding the chromosome shown in FIG. 9 for the ship lines 1 through 3;

FIG. 17 exemplifies the data structure of the segment connection probability table of legal connecting flights, which is generated by the decoding process of a chromosome in the flowchart shown in FIG. 13;

DESCRIPTION OF THE PREFERRED EMBODIMENTS

Figure 1:
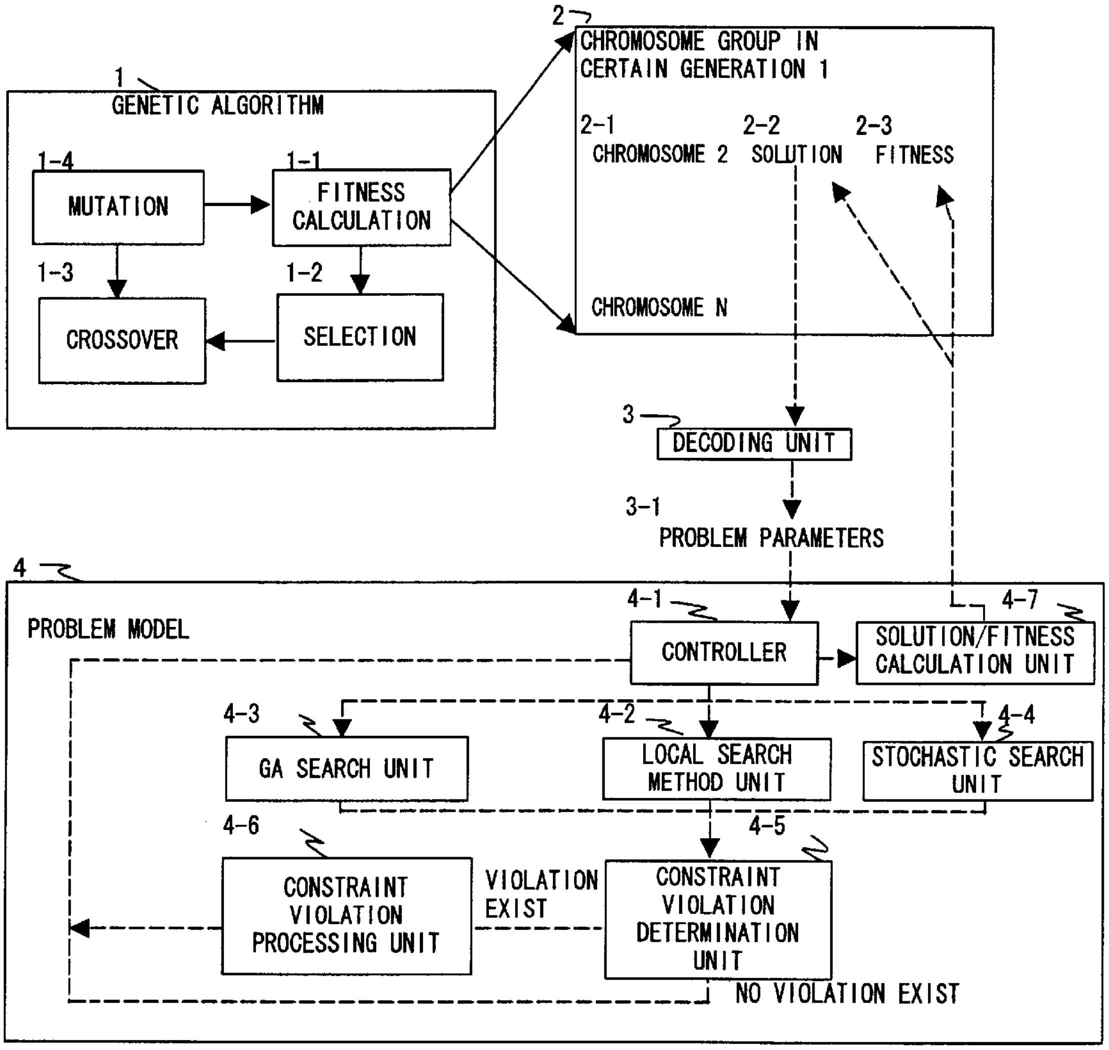
FIG. 1 shows the principle of a preferred embodiment according to the present invention.

Hereinafter, a preferred embodiment according to the present invention is explained by referring to the drawings.

FIG. 1 explains the principle of an optimizing apparatus according to one preferred embodiment of the present invention. In FIG. 1, A GA (Genetic Algorithm) is adopted as an optimization mechanism. However, the optimization mechanism of the present invention is not limited to A GA.

A GA processing unit 1 is composed of a fitness calculation unit 1-1, a selection operation unit 1-2, a crossover operation unit 1-3, and a mutation operation unit 1-4.

The fitness calculation unit 1 calculates the fitness of each chromosome 2-1 within a chromosome group 2 in a certain generation, which is managed by the fitness calculation unit 1-1 itself. The selection operation unit 1-2 performs a selection operation to select as many chromosomes 2-1 with high fitnesses as possible, as parents of the next generation.

The crossover operation unit 1-3 pairs the chromosomes 2-1 selected by the selection operation unit 1-2 at random, and partially exchanges between the gene strings of two chromosomes 2-1 with a certain probability (crossover rate).

The mutation operation unit 1-4 exchanges a gene at each locus of the chromosome 2-1 for its corresponding allele.

The fitness calculation unit 1-1 replaces "N" chromosomes 2-1 within the chromosome group 2 with those 2-1 of the next generation, which are obtained by the mutation operation unit 1-4.

The chromosome 2-1 is composed of "m" ("m" is an arbitrary integer) genes. The genes at respective loci are represented by a character string, a bit string, an integral sequence, etc. Each chromosome 2-1 comprises a solution 2-2 and a fitness 2-3. The solution 2-2 is a solution generated when a chromosome 2-1, which is converted into parameters of a problem model with in a problem model calculation unit 4 by a decoding unit 3, is evaluated by the problem model calculation unit 4 (?). The fitness 2-3 is a fitness of a chromosome 2-1, which is determined by an evaluation value (objective function value) of the solution 2-2 in the problem model.

The decoding unit 3 sequentially extracts a chromosome 2-1 from the chromosome group 2, and decodes respective genes of the chromosome 201 to parameters 3-1 of a problem, which are calculated by the problem model calculation unit 4. Use of a probability table (not shown) for some of the genes in this decoding process is one of the features of the present invention.

The problem model calculation unit 4 receives problem parameters 3-1 from the decoding unit 3, generates a solution to the target problem based on the parameters 3-1, and calculates the evaluation value of the solution. The evaluation value is, for example, equal to the fitness of a chromosome 2-1.

The problem model calculation unit 4 comprises a controller 4-1, a local search method unit 4-1, a GA search unit 4-3, a stochastic search unit 4-4, a constraint violation determination unit 4-5, a constraint violation processing unit 4-6, and a solution/fitness calculation unit 4-7.

The controller 4-1 controls the whole of the problem model calculation unit 4-4, and invokes the local search method unit 4-2, the GA search unit 4-3, or the stochastic search unit 4-4 depending on a condition during solution generation. For example, if the need for searching for a new solution candidate arises with a local search method, a new candidate is searched by invoking the local search method unit 4-2. If a new solution candidate can be searched by decoding the genes of a chromosome 2-1, a new solution candidate is searched by invoking the GA search unit 403. Or, if a new solution candidate can be searched with a stochastic search, a new solution candidate is searched by invoking the stochastic search unit 4-4.

By repeating the process of the local search method unit 4-2, the GA search unit 4-3, or the stochastic search unit 4-4, an optimum or a semi-optimum solution is obtained. Whether or not a solution obtained until at that time causes a constraint violation is determined by the constraint violation determination unit 4-5 during the process.

When the constraint violation determination unit 4-5 determines that a constraint violation is caused, the constraint violation processing unit 4-6 is invoked, which performs a process such as a removal of part of the solution, which is added by the local search method unit 4-2, the GA search unit 4-3, or the stochastic search unit 4-4. The process is then transferred to the controller 401. The controller 401 determines whether or not the solution generation process is terminated. If the solution generation process is not terminated, the above described determination is made, and the local search method unit 4-2, the GA search unit 4-3 or the stochastic search unit 4-4 is invoked.

When the controller 4-1 determines that the solution generation process is terminated while the above described loop process is repeated, the solution/fitness calculation unit 4-7 receives a generated solution from the controller 4-1, and calculates its evaluation value (the fitness of a chromosome 2-1). The solution/fitness calculation unit 4-7 then returns the solution 2-2 of the chromosome 2-1, which is decoded by the decoding unit 3, and its fitness 2-3 to the chromosome group 2.

The main points of the present invention will be briefly explained.

[1] When problem parameters 3-1, which are obtained by decoding performed by the decoding unit 3, are entered into the problem model calculation unit 4, the problem model calculation unit 4 generates a problem solution based on the problem parameters 3-1.

The problem model within the problem model calculation unit 4 is in a state where the problem can correctly be described with the parameters which are entered beforehand.

[2] The problem model calculation unit 4 generates a solution to the problem model while invoking the local search method unit 4-2, the GA search unit 4-3, or the stochastic search unit 4-4 according to the control of the controller 4-1. Whether or not the solution generated by the problem model calculation unit 4 causes a constraint violation is determined by the constraint violation determination unit 4-1. If a constrain violation is not caused, the process is continued in the problem model calculation unit 4. If a constraint violation is determined to be caused, part of the solution, which is newly added by the local search method unit 4-2, the GA search unit 4-3, or the stochastic search unit 4-4, is removed by the constraint violation processing unit 4-6.

[3] The local search method unit 4-2 searches for a solution candidate with a local search method. For example, if an irregular flight occurs during crew pattern generation, a connecting flight that complements the irregular flight is searched.

[4] The GA search unit 4-3 searches for a solution candidate, for example, based on the information of some genes of a chromosome 2-1.

[5] The stochastic search unit 4-4 searches for a solution candidate by referencing a probability table (not shown). In the probability table, a new probability is calculated from the probability of a solution candidate, which is calculated beforehand, and the relationship between the solution generated so far and a solution candidate, and a solution candidate is presented according to this probability. Solution candidates presented from the probability table include candidates not only according to a simple probability but also suited for the special characteristic of a problem.

The stochastic search unit 4-4 is invoked, for example, when the process by the GA search unit 4-3 is disabled.

[6] After generating a final solution, the problem model calculation unit 4 calculates the fitness of the solution, and returns the solution 2-2 and the fitness 2-3 of the chromosome 2-1, which is decoded in [1], to the chromosome group 2.

[7] The above described points [1] through [6] are executed for all of the chromosomes 2-1 within the chromosome group 2. When the solutions 2-2 and the fitnesses 2-3 of the chromosomes 2-1 are obtained, the fitness calculation unit 1-1 alternates the generation of the chromosome group 2, and advances the entire optimization.

Figure 2:
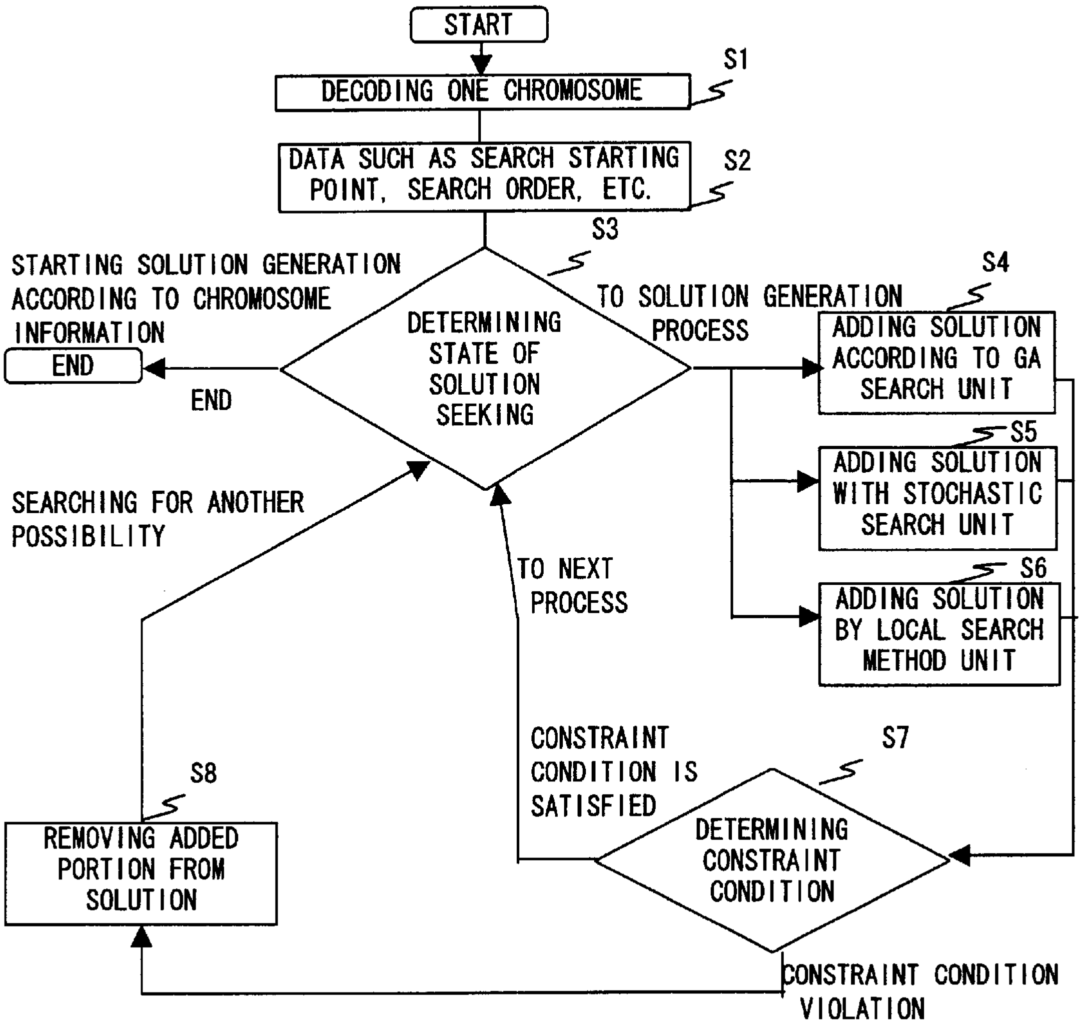
FIG. 2 is a flowchart explaining the principle of the preferred embodiment according to the present invention.

FIG. 2 is a flowchart showing the processing algorithm of the optimizing apparatus shown in FIG. 1. Note that this flowchart is the one targeting one chromosome 2-1.

First of all, the decoding unit 3 extracts one chromosome 2-1 from the chromosome group 2, and decodes the extracted chromosome 2-1 (step S1). With this decoding, data (chromosome information) such as a search starting point, a search order, etc. are obtained (step S2). These data are obtained by decoding genes 41 through 43 of a chromosome 40 to be described later.

Next, the problem model calculation unit 4 starts to generate a solution generation according to the above described chromosome information obtained by the decoding. The problem model calculation unit 4 determines the state of solution seeking (step S3), and performs a solution generation process according to the result of the determination.

The solution generation process is implemented by any of "the process adding a solution according to the GA search unit 4-3" (step S4), "the process adding a solution with the stochastic search unit 4-4 (step S5), and "the process adding a solution by the local search method unit 4-2" (step S6).

Whether or not the solution, which is generated by the process of step S4, S5, or S6, satisfies a constraint condition is determined by the constraint violation determination unit 4-1 (step S7).

If the solution is determined to satisfy the constraint condition in step S7, the processing goes back to step S3 where it is determined whether the solution generation process is either continued or terminated.

If the solution generated in step S4, S5, or S6 is determined to cause a constraint violation in step S7, the part added in step S4, S5, or S6 is removed from that solution (step S8). The processing then goes back to step S3, and another solution starts to be searched.

The processes in steps S3 through S8 are repeated as described above. When a solution (an optimum or a semi-optimum solution) the evaluation value of which is equal to or higher than a predetermined value is determined to be obtained in step S3, the processing is terminated. Also when the processing becomes difficult to be continued, it is terminated. Additionally, when a satisfactory solution cannot be obtained even if the number of search times exceeds a predetermined number, the processing is terminated in some cases.

Next, a preferred embodiment, which is suitable for generating a crew pattern of an aircraft crew over a long time period, is explained.

Crew pattern generation is one type of a constraint satisfying optimization problem (an optimization problem of satisfying all of given constraint conditions and of optimizing a target evaluation index), and is a time series scheduling problem for which automation is recognized to be difficult.

First of all, the outline of a crew pattern generation operations handled by this preferred embodiment are explained.

The flight crew of an aircraft start their work from the flight leaving the airport (base airport) at which their office exists. After the crew make up to four flight connections per day, they finish their work and stay at the airport at which they arrived last. The crew start their work from a flight leaving that airport on the next day. Thus, the crew repeat their operations for a couple of days, and then they return to the base airport from which the initial flight started. A pattern of this series of flight connections is referred to as a crew pattern. With the crew pattern generation operations, a plurality of patterns must be generated so that all of the flights on a flight schedule must be included in any of the patterns.

Among aircraft flights, an irregular flight, which is in service only on a particular day, is included. When crew patterns are generated, such an irregular flight must be suitably included in the patterns so as not to cause an inconsistency in operation dates, which leads to further complicatedness of the problem.

The complexity of a problem may differ depending on an aircraft type (a type used on a main route, or a type used on a local route). However, the scale of a problem roughly depends on the number of flights when crew patterns are generated. According to the operation data in 1997, the target number of flights is 38 in a problem of the smallest scale (aircraft type is Boeing 777), whereas that in a problem of the largest scale is 364. In the problem of the largest scale, flights to be connected next can be selected from among 150 flights on average for the respective 364 flights. Therefore, even only the number of their combinations is calculated to be the 364th power of 150 (=the 780th power of 10).

Furthermore, since different crew patterns must be generated for respective days on a schedule for up to two months, the number of combinations is further calculated to be the 60th power of the 780th power of 10 at the maximum. Actually, however, crew patterns are generated to provide services in as same patterns as possible. Therefore, a search space does not become such large. However, the search space still remains large extremely (the third or the fourth power of the 780th power of 10).

The essence of difficulty in crew pattern generation exists in the following points as is evident from the above description.

1) A search space (the number of combinations) is extremely large.

2) There are many constraint conditions, and a problem is complicated.

Constraint conditions include 30 types or more. It is difficult to obtain even a constraint satisfying solution, to say nothing of an optimum solution.

These constraint conditions include a local condition that can be determined while an individual crew pattern is generated, and a global condition that cannot be determined until all of work patterns are completed. The local condition can be ignored during the process in some cases. However, the global condition cannot be ignored.

3) The required level of solution quality is high.

With a crew pattern that is difficult to derive a constraint satisfying solution, and has a strict requirement for solution optimization, the total number of crew required for flight services is determined. If a pattern such that one crew member can work on as many flights as possible per day is generated, the total number of required crew is reduced.

The following preferred embodiment is the one in which the present invention is applied to the above described work pattern automatic generation. According to this preferred embodiment, unique expansions are made to a GA having the following features 1) through 3), and the GA is built in a system, so that a solution to a full dated model, which is insoluble so far, can successfully be obtained.

1) Knowledge acquisition for problem solving is not always required.

2) An extensive search can be made.

3) Parallelism of operations is high, and processes by a plurality of CPU can be increased in speed. The expansions made to the general framework of A GA are as follows.

1. Applying a Probability Table for Flight Connections.

In this preferred embodiment, a connection from one flight to another is defined to be a variable, and a connectable candidate is searched as an option. Normally, a plurality of such options exist. However, the degree of preferableness of adopting each option is not always equal. Therefore, combinations of flights that are connected when an expert generates crew patterns are analyzed, and a feature of flights of a desirable combination is extracted, and a probability table in which the feature is reflected on a selection probability of each option is generated. With this table, the frequency at which a desirable connection state appears becomes high, so that a solution of high quality can be obtained in a short time.

2. Segmentation

A search space is restricted by segmenting some variables into groups, and by preparing high-order variables the values of which are used as options. Actually, attention is paid to the point that flights are connected by an expert so as to get as same crew as possible aboard flights operated by the same aircraft, and the flights operated by the same aircraft are altogether handled as a group (segment). At this time, a group is not decisively generated, and options of grouping (segmentation) are set as variables, which are searched with a GA. Note that a probability table for segmentation selection is prepared, and segmentation is determined by referencing the probability table at the time of decoding with a GA.

In this way, it becomes possible to handle 3 flights or so on average, and to seek a solution to a homogeneous problem in almost the same processing time as that required for a problem the scale (the number of flights) of which is approximately one third. Also the possibility of seeking a solution to a problem that cannot be solved with conventional methods can be increased the same time a solution-seeking time is shortened. Actually, by introducing this method, a search space can dramatically be reduced, and a solution can be obtained also to a large-scale problem.

Figure 3:
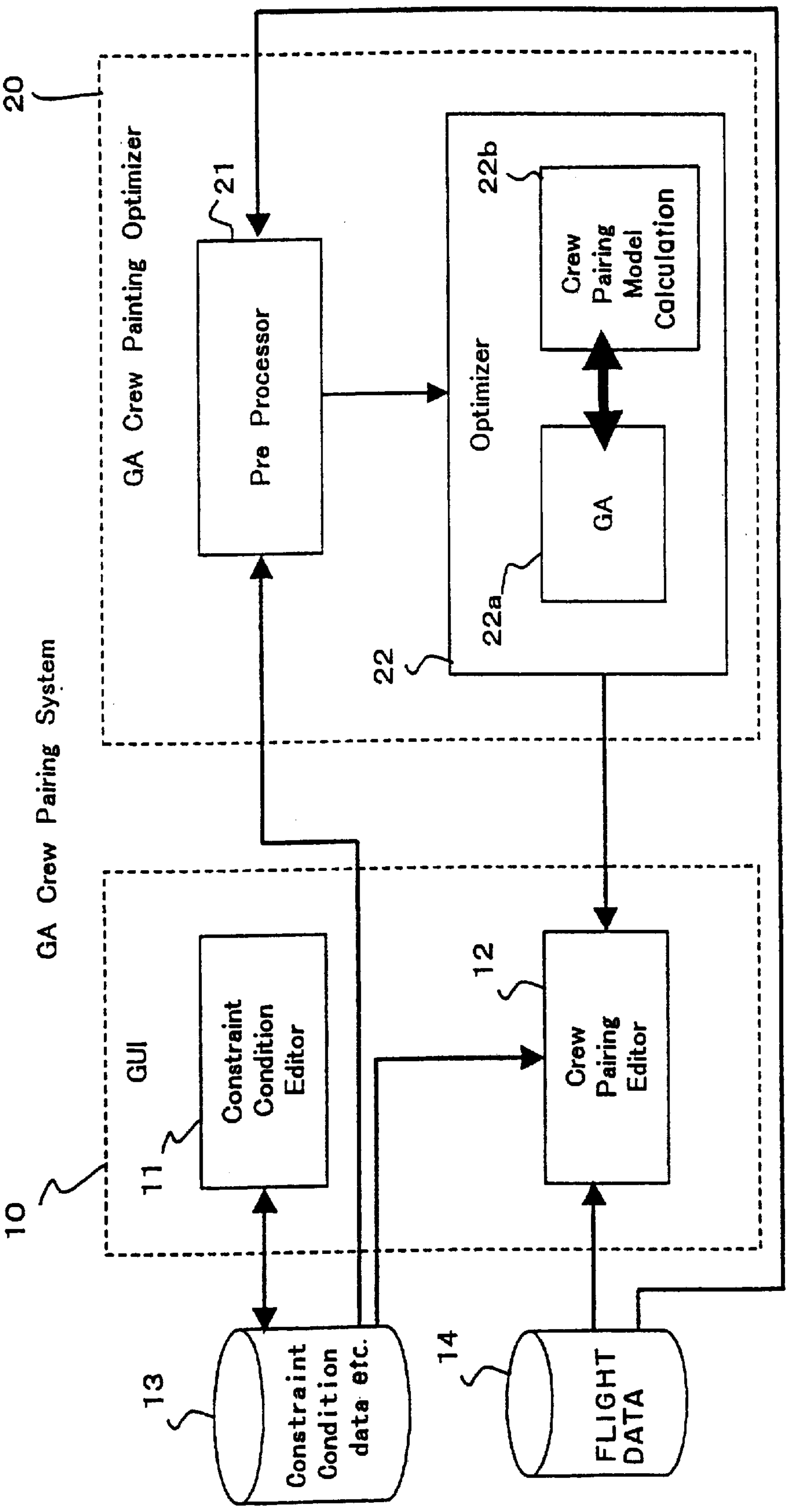
FIG. 3 is a block diagram showing the entire configuration of the preferred embodiment according to the present invention.

FIG. 3 is a block diagram showing the entire configuration of a GA crew pairing system according to the preferred embodiment of the present invention.

A GUI (Graphical User Interface) device 10 is, for example, a personal computer, and runs a crew pairing editor 11 and a constraint condition editor 12, which are software.

The constraint condition editor 11 is an editor for generating pre-process information (constraint conditions, GA parameters, etc.), which are required for a pre-process. The pre-process information generated/changed by the constraint condition editor 11 are stored in a file 13. The pre-process information stored in the file 13 is read by a pre-processor 21.

The crew pairing editor 12 inputs a crew pattern generated by an optimizer 22 of a GA crew pairing optimizer 20, and graphically displays the pattern on a display device (not shown). Additionally, the crew pairing editor 12 displays flight data stored in a file 14 on the display device. This flight data includes the information of each flight (a flight number, an aircraft type, an aircraft number, departure airport, departure time, arrival airport, arrival time, a flight operation pattern, etc.), which are required for generating a crew pattern.

The flight data stored in the file 14 is read by the pre-processor 12 within the GA crew pairing optimizer 20.

The GA crew pairing optimizer 20 comprises the pre-processor 21 and the optimizer 22.

The optimizer 22 comprises a GA execution unit 22*a* and a crew pairing model calculation unit 22*b*. The GA execution unit 22*a* is equivalent to the GA processing unit 1, the chromosome group 2, and the decoding unit 3, which are shown in FIG. 1, whereas the crew pairing model calculation unit 22*b* is equivalent to the problem model calculation unit 4 shown in FIG. 1.

The pre-processor 21 performs a pre-process when a crew pattern is made. The pre-process includes the following operations.

1) Reading pre-process information (data of all flights, constraint conditions, GA parameters, etc.)

2) Listing all of connectable flights and deadheads for each flight. Notice that a deadhead is to transport a pilot to a departure airport of the flight operated by the pilot next. For this transportation, a normal flight or railway is used. The deadhead has two types such as a same-day connection and a next-day connection. Accordingly, this listing includes connecting flights for the same and the next days (connection information setting process).

3) Listing all of possible segmentations for each ship line (ship line setting process). A ship line is a sequence in which flights that are operated by one aircraft type on one day are arranged in time series.

In the above described connection information setting process, all of connectable flights and deadheads are listed for each flight as described above. The degree of preferableness of each connection is then calculated and set according to the evaluation criteria that are heuristically derived from a connection state (generation of a connection probability table).

In the above described ship line setting process, all of possible segmentations are made for ship line, and whether or not each segmentation violates constraints is determined. Furthermore, a heuristically derived evaluation is made for each segmentation method beforehand, and (the evaluation value?) is registered.

Figure 4:
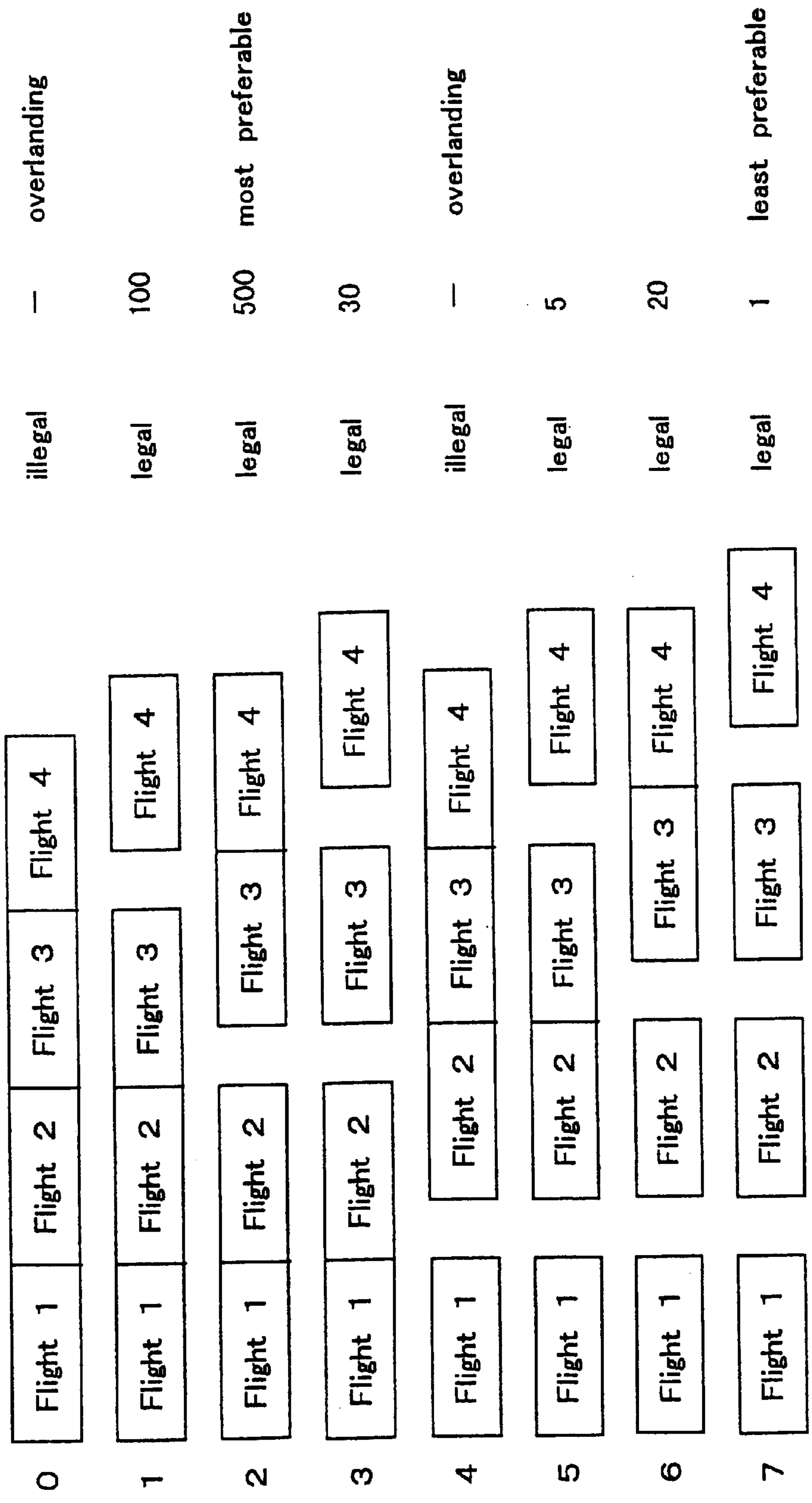
FIG. 4 explains a ship line setting process.

FIG. 4 exemplifies the above described ship line setting process.

This figure exemplifies the segmentation of a ship line in which four flights 1 through 4 are connected, and shows 8 segmentation method types indicated by numbers 0 through 7. In this figure, "illegal" indicates segmentation which violates constraints. Accordingly, segmentations indicated by 0 and 4 correspond to constraint violations.

For a connection which does not violate constraints, an evaluation value indicated by "point" is set. By way of example, for segmentation of 2, the highest evaluation value "500" is set. For segmentation of 7, the lowest evaluation value "1" is set. A segmentation probability table is generated according to their evaluation values for 6 segmentation types which do not violate constraints. The method generating the segmentation probability table will be described later.

The operations of the optimizer 22 will be briefly described below.

[1] The crew pairing model calculation unit 22*b* decodes the respective individuals within the chromosome group 2 input from the GA execution unit 22*a*, and converts the individuals into parameters of a problem (a crew paring model). The individuals referred to here correspond to chromosomes 2-1 (a representation style of an individual) shown in FIG. 1.

[2] The crew pairing model calculation unit 22*b* sets ship line segments by using the first parameters obtained in [1] and the segmentation probability table.

[3] The crew pairing model calculation unit 22*b* determines the assignment order of the respective segments according to the second parameters obtained in [1].

[4] The crew pairing model calculation unit 22*b* sets the next connection information (segment connection probability table) for the flight at the end of the segment.

[5] The crew pairing model calculation unit 22*b*

(a) sequentially extracts the segments according to the assignment order obtained in [3] and connects the segments according to the third parameters obtained in [1] or the segment connection probability table obtained in [4].

(b) checks whether or not a connection causes a constraint violation when connecting the segment.

(c) removes the segment connected in (a), and returns control to (a) so as to connect a new segment, if a segment causes a constraint violation.

(d) repeats the operations of (a) through (c) until a solution which satisfies a preset condition is generated.

[6] The crew pairing model calculation unit 22*b* calculates the fitness of the solution generated in [5].

[7] The above described solution and fitness are returned to the GA execution unit 22*a*.

[8] The GA execution unit 22*a* alternates the generation of the chromosome group 2 with a genetic algorithm when solutions and fitnesses of all of the individuals (chromosomes 2-1) are input from the crew pairing model calculation unit 22*b*.

[9] The crew pairing model calculation unit 22*b* generates an optimum or a semi-optimum solution by repeating [1] through [7] for the individuals (chromosomes 2-1), which are obtained by this generation alternation.

[10] The optimizer 22 outputs the optimum or the semi-optimum solution to the crew pairing editor 12.

FIG. 5 exemplifies constraint conditions used in this preferred embodiment. Crew patterns generated in this preferred embodiment must satisfy constraint conditions such as the number of flights to be worked (4 flights or less), on-board working hours (6 hours or more), working hours (11 hours or less), preparation time before on-board operations (60 minutes), a connection time during the day (90 minutes or more), rearrangement time after on-board operations (30 minutes), an airport at which lodging is prohibited (airport name specification), a base ratio (Tokyo 60% to Osaka 40%), a base airport (airport name specification), an upper limit of consecutive work days (3 days), fixed pattern specification (specification with flight listing), etc.

Figure 6:
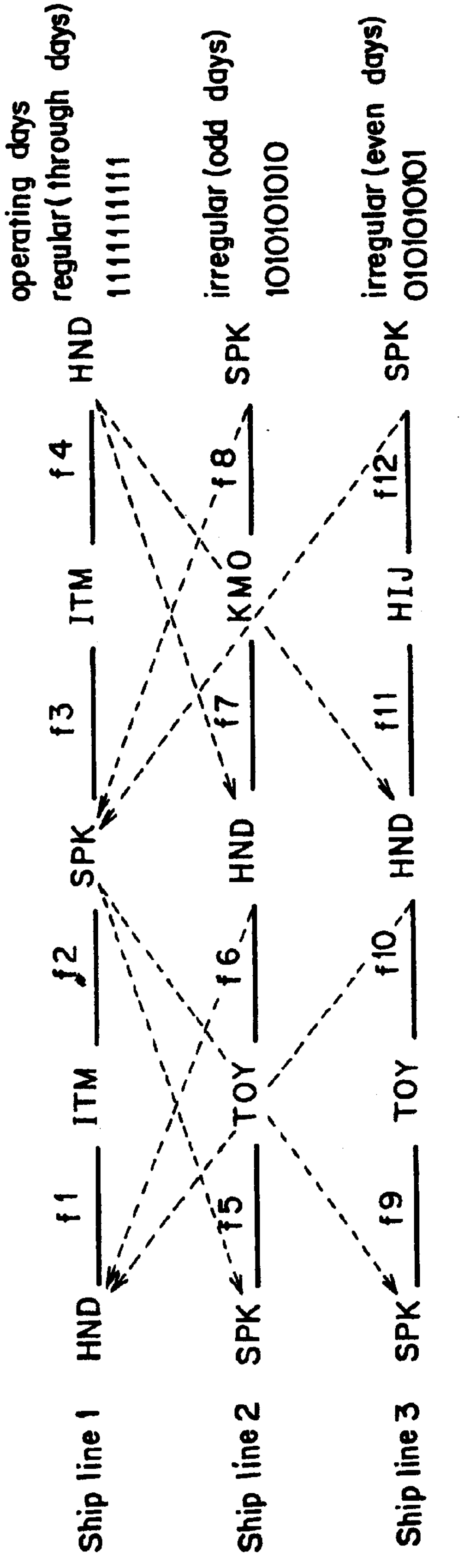
FIG. 6 shows a specific example of ship lines.

FIG. 6 shows a specific example of ship lines.

Shiplines 1 through 3 are scheduled as follows, and each of them is a concatenation of four flights.

| | |
|---|---|
| Ship line 1 | HND (Haneda) → ITM (Itami) → SPK (Sapporo) → ITM (Itami) → HND (Haneda) |
| Ship line 2 | SPK (Sapporo) → TOY (Toyama) → HND (Haneda) → KMO (Kumamoto) → SPK (Sapporo) |

-continued

| | |
|---|---|
| Ship line 3 | SPK (Sapporo) → TOY (Toyama) → HND (Haneda) → HIJ (Hiroshima) → SPK (Sapporo) |

"f1" through "f12" given to the respective flights of the ship lines 1 though 3 of FIG. 6 are flight numbers. The ship line 1 is composed of flights operated through days. The ship line 2 is composed of irregular flights operated only on odd days. The ship line 3 is composed of irregular flights operated only on even days. Bit strings shown at the right end of this figure indicate operating days, and each bit corresponds to one day. A bit value "1" indicates operation, whereas a bit value "0" indicates non-operation.

In the meantime, flights are classified into regular flights and irregular flights. The regular flights are flights operated through days during a scheduled time period. The irregular flights are flights that are not operated through days during a scheduled time period.

Figure 7:
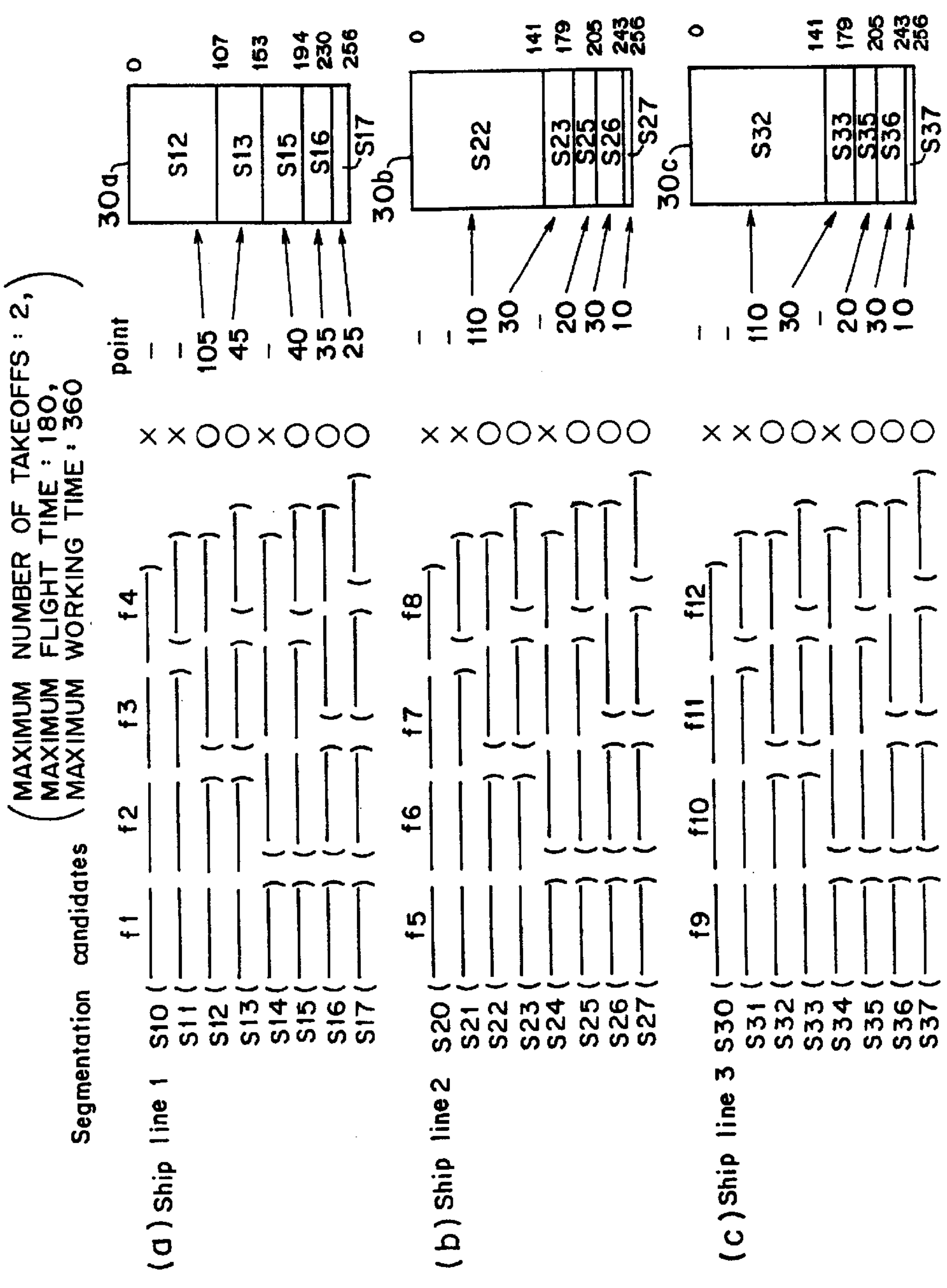
FIG. 7 explains the method generating segmentation probability tables for the respective ship lines shown in FIG. 6.

Next, an example of the method generating the segment connection probability table for the respective ship lines 1 through 3 is described by referring to FIG. 7. Here, a constraint condition such that the number of flights to be worked on one day is "2" is assumed to be imposed for ease of understanding. Additionally, the following point addition rules are laid down. These rules are those set heuristically.

100 points if a ship line is segmented into two.

20 points if a ship line is segmented into three.

0 point if a ship line is segmented into four.

10 points if a ship line is segmented at HND or ITM.

5 points if a ship line is segmented at SPK.

Points, which are given to respective segmentations of the ship lines 1 through 3 in accordance with the above described rules, are shown in FIG. 7. In all of the ship lines 1 through 3, 5 segmentation types (marked by "○" on the right side) satisfy the constraint condition.

Segmentation in each of the ship lines, which satisfies the constraint condition, is mapped onto a preset width (0 to 256 in the example of FIG. 7) according to its points, so that segmentation probability tables 30*a* through 30*c* are generated.

In the example shown in FIG. 7, segmentations are registered to the segmentation probability tables 30*a* through 30*c* in a descending order of points. Additionally, the number of registered segments is distributed proportionally to points. Accordingly, a segment with higher points is selected with a higher probability in the segmentation probability tables 30*a* through 30*c*. Therefore, if a segment search value (segmentation information) of a gene is selected at random from 0 to 256, segments are selected by referencing the segmentation probability tables 30*a* through 30*c* for the respective ship lines 1 through 3, thereby implementing a suitable segment selection. In the segmentations shown in FIG. 7, the maximum number of takeoffs "2", the maximum flight time "180 minutes", and the maximum working time "360 minutes" are set as constraint conditions. Note that the method storing the segmentations in the segmentation probability tables 30*a* through 30*c*, which is shown in FIG. 7, is merely one example. A variety of storage methods may be considered as a segmentation storage method.

FIG. 8 exemplifies the data structure representing the segmentation information S10 through S17 of the ship line 1. The segmentations S10 through S17 are represented by 3-bit strings. The first bit indicates whether or not segmentation is made between the f1 and the f2, the second bit indicates whether or not segmentation is made between the f2 and the f3, and the third bit indicates whether or not segmentation is made between the f3 and the f4. A bit value "1" indicates segmentation, whereas a bit value "0" indicates non-segmentation.

Figure 9:
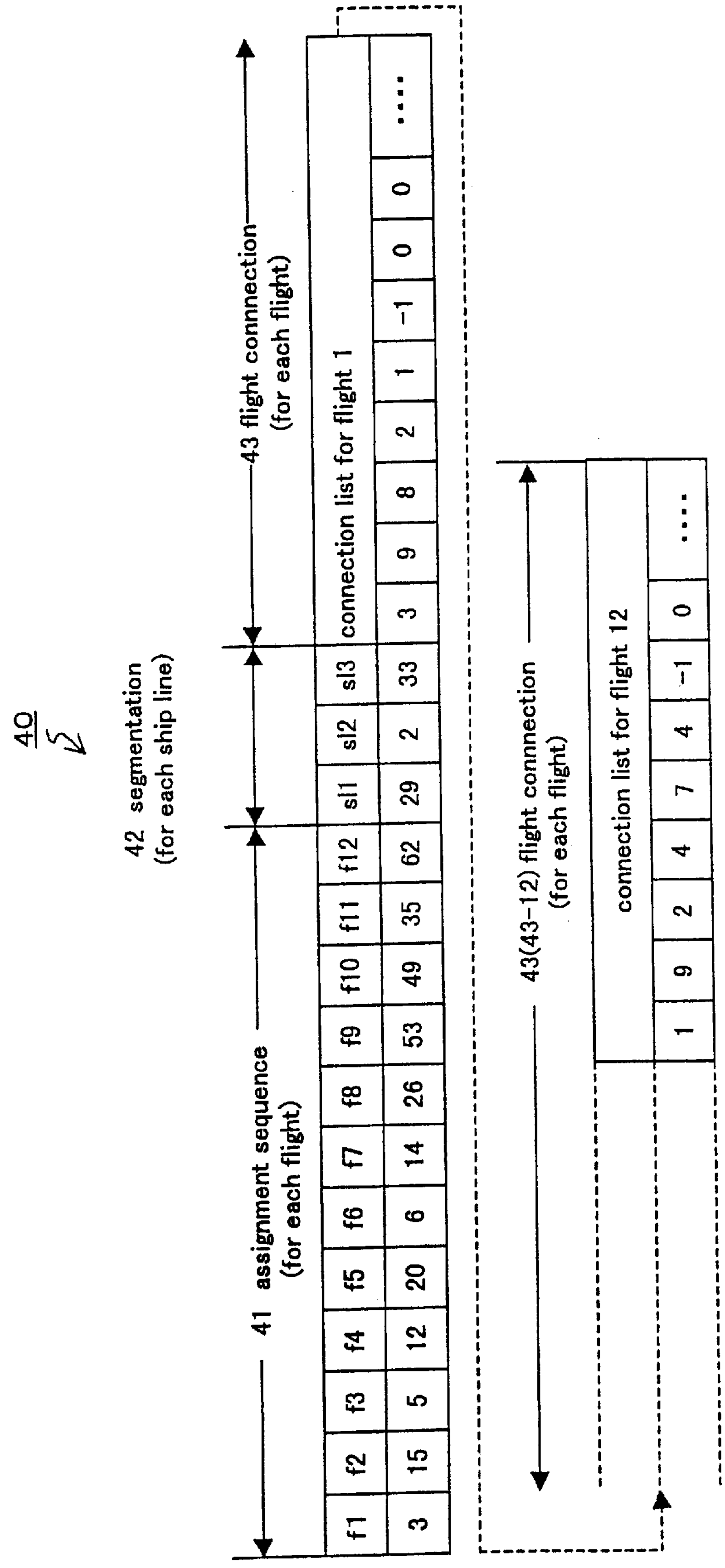
FIG. 9 exemplifies the data structure of a chromosome used in the preferred embodiment.

FIG. 9 exemplifies the data structure of a chromosome 2-1 used in this preferred embodiment.

A chromosome 40 shown in this figure is intended to generate crew patterns from the ship lines 1 through 3 shown in FIG. 6. The chromosome 40 is composed of a gene 41 storing the assignment order information of the flights f1 through f12, a gene 42 storing the segmentation information of the respective ship lines 1 through 3, and a gene 43 (43-1 through 43-12) storing connecting flight candidate information (a connection candidate list) of the respective flights f1 through f12.

This chromosome 40 is decoded in an order of the genes 42, 41, and 43. The gene 42 is a data sequence of 3 integers, and sequentially stores the segmentation information (integral values) of the respective ship lines 1 through 3 (SL1 through SL3). The respective integral values of the ship lines 1 through 3 in the gene 42 are address values in the above described segmentation probability tables 30*a*, 30*b*, and 30*c*.

The values assigned to the ship lines 1 through 3 in the gene 42 are individually decoded in an order of the ship lines 1, 2, and 3. When being decoded, the values assigned to the ship lines are used as pointers pointing to the addresses in the corresponding segmentation probability tables in order to obtain the segment information from the addresses.

As described above, legal segmentation information are stored in the segmentation probability tables 30*a* though 30*c*. Accordingly, the segmentation information of the respective ship lines 1 through 3 can be obtained by decoding the gene 42. Then, one or a plurality of segments can be obtained for the respective ship lines 1 through 3 based on the segmentation information. As stated earlier, a segment is a connection of one or a plurality of flights, and each segment is stipulated by the first flight (initially departing flight) and the last flight (lastly arriving flight).

The first flight is acquired from each segment thus obtained. The acquired first flight is used to decode the gene 41. The gene 41 is a data sequence of 12 integers, and stores assignment order information in an order of the flights 1 through 12 (f1 through f12). As a result of the decoding of the gene 42, only the flights corresponding to the first flight are extracted as legal flights, which are then sorted according to the corresponding values of the gene 41 (legal flights are sorted in an ascending order of the integral values of the gene 41). As a result of the sorting, the generation of a crew pattern which begins with the segment where its first flight is the initially sorted flight is started. Additionally, a segment connection probability table is generated for the flights at the end of the segments where their first flights are the legal flights. This segment connection probability table is used to connect segments when a crew pattern is generated, as will be described later.

The gene 43 comprises 12 sequences 43 (43-1 through 43-12) which correspond to the respective flights 1 through 12. In each of the sequences 43, a connection candidate list for each flight is stored. The elements of each of the sequences 43 are integral values indicating flight identifiers. This gene 43 is used to connect he segments of a crew pattern. That is, when the segments are connected, the elements of the sequences (the first flights of the segments, which will be connection candidates), are extracted in an order of the sequences (an order of the connection candidate lists). The extracted segments are connected to the crew pattern generated until at that time. Then, whether or not this segment connection is a constraint violation is determined.

If the segment connection is a constraint violation, this connection is destroyed, and the next segment is selected from the sequence 43. If the segment connection is not a constraint violation, the crew pattern continues to be generated. The number of elements (the number of connecting flight candidates)of each of the sequences 43-1 through 43-12 varies depending on a flight, and "−1" (forcible termination) is set after the last element.

Figure 10:
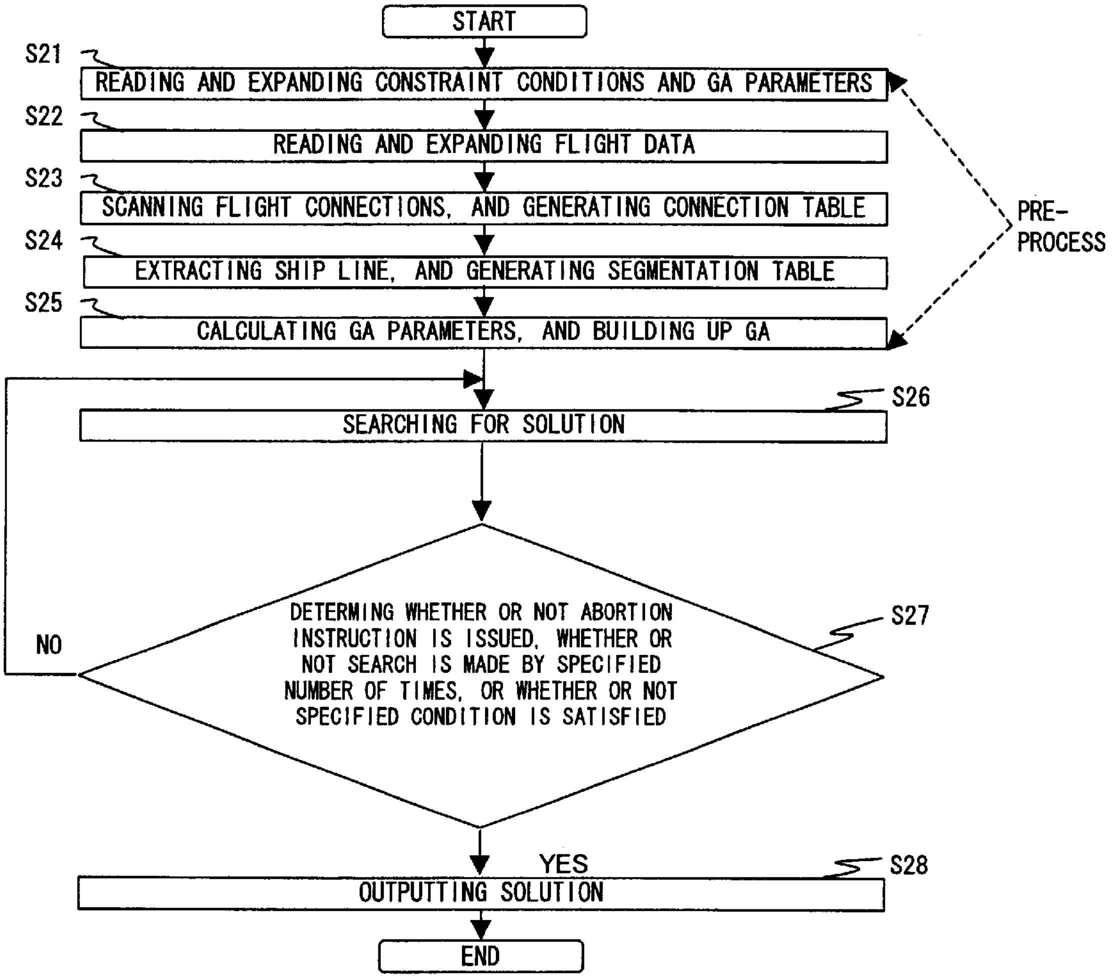
FIG. 10 is a flowchart explaining the entire processing according to the preferred embodiment.

Next, the entire processing in this preferred embodiment is explained by referring to the flowchart shown in FIG. 10. In this figure, steps S21 through S25 indicate a pre-process performed by a pre-processor 21.

First of all, the pre-processor 21 reads constraint conditions, GA parameters, etc. from the file 13, and expands them in a memory (not shown) (step S21).

The GA parameters are, for example, the number of chromosomes 2-1 in the chromosome group 2, the selection rate of the selection operation unit 1-2, the crossover rate of the crossover operation unit, the mutation rate of the mutation operation unit 1-4, etc.

Next, the pre-processor 21 reads the whole of flight data from the file 14, and expands them in the memory (step S22).

The pre-processor 21 then examines a flight connection based on the flight data read from the file 14, and generates a connection table to be described later for each flight (step S23).

Next, the pre-processor 21 extracts a ship line based on the information read from the file 13, and generates the segmentation probability table shown in FIG. 7 for each ship line (step S24).

The pre-processor then calculates the GA parameters read in step S21, and builds up the GA 22*a* (step S25). Here, the pre-process is terminated.

Next, the optimizer 22 executes the algorithm shown in the flowchart of FIG. 2, and searches for a solution to the problem while utilizing the GA execution unit 22*a* and the crew pairing model calculation unit 22*b* (step S26). The crew pairing model calculation unit 22*b* searches for a solution with th GA search unit 4-3, the local search method unit 4-2, or the stochastic search unit 4-4.

The local search method unit 4-2 performs, for example, the following process.

Example 1) After an irregular flight (a crew pattern of 01010101), which is operated on even days, is assigned to a regular flight operated through days, an irregular flight (a crew pattern of 10101010), which is complementary and operated on odd days, is searched and assigned to the remaining operation days of the through-days flight.

Example 2) If there is no complementarily irregular flight and if the second day of the first crew pattern can be connected from a base by a deadhead when the start of a crew pattern is an irregular flight, such a pattern is generated.

Additionally, the fitness (evaluation value) of each chromosome 2-1 is set, for example, by the following equation.

fitness=$\alpha$·(the number of flights that are not included in a crew pattern)+$\beta$·(the number of crew patterns)+$\gamma$·(moving expense)+$\delta$·(deviation from a base ratio)+ . . .

The above described proportional constants $\alpha$, $\beta$, $\gamma$, $\delta$, etc., are determined, for example, by repeating experiments. The above described equation is applied to a generated solution, and its fitness is calculated. Remember that $\alpha$, $\beta$, $\gamma$, and $\delta$ are positive constants.

The process in step S26 is repeated according to the control of a segment connection controller (corresponding to the controller 4-1 shown in FIG. 1) within the crew pairing model calculation unit 22*b* until it is determined whether or not an instruction to abort the process is issued, whether or not a search is made by a specified number of times, or whether or not a solution that satisfies a specified condition is obtained (step S27).

When any of the above described determinations is made by the segment connection controller in step S27, the crew pairing model calculation unit 22*b* outputs the solution obtained so far (such as the best solution, etc.) to the crew pairing editor 11 (step S28).

Figure 11:
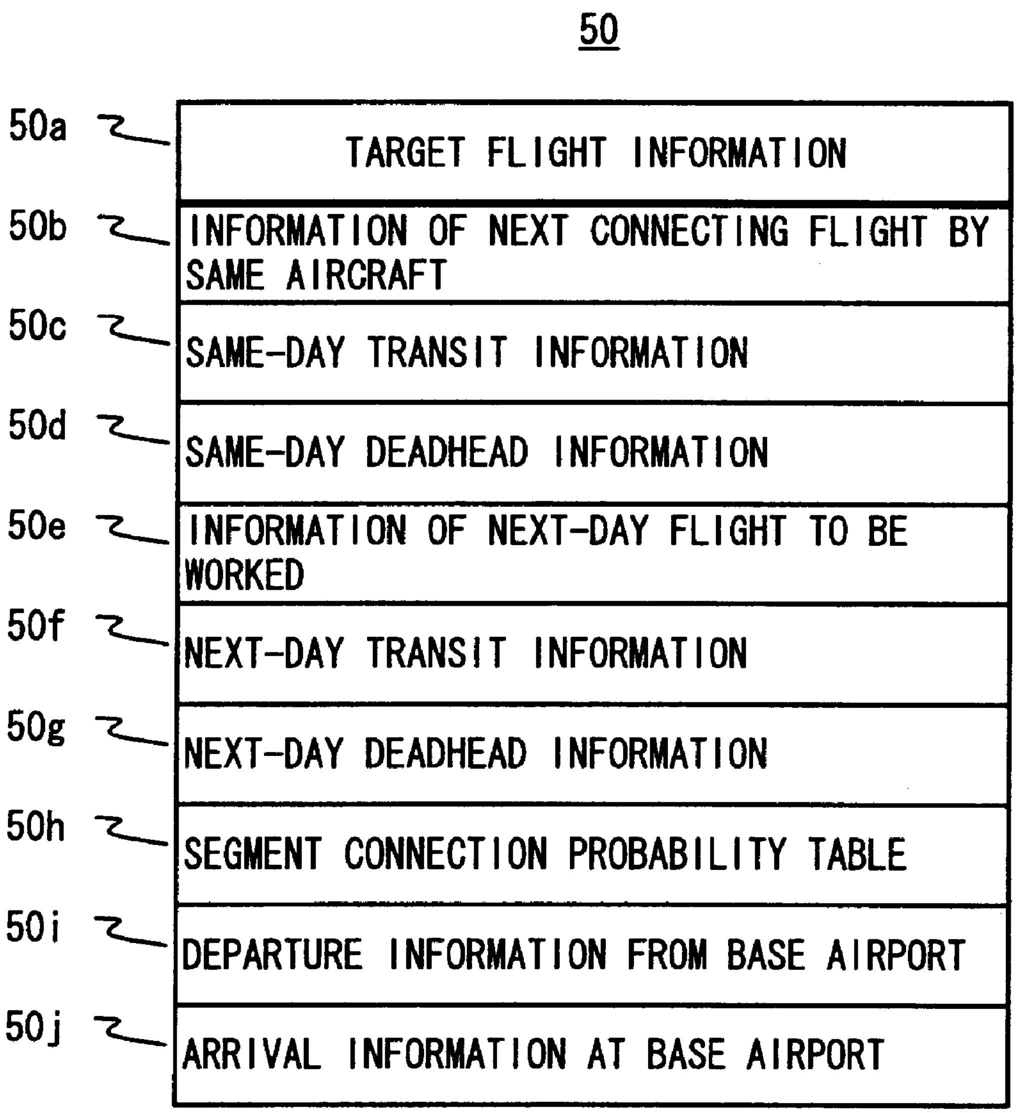
FIG. 11 shows the data structure of a connection table generated by a pre-process.
Figure 12:
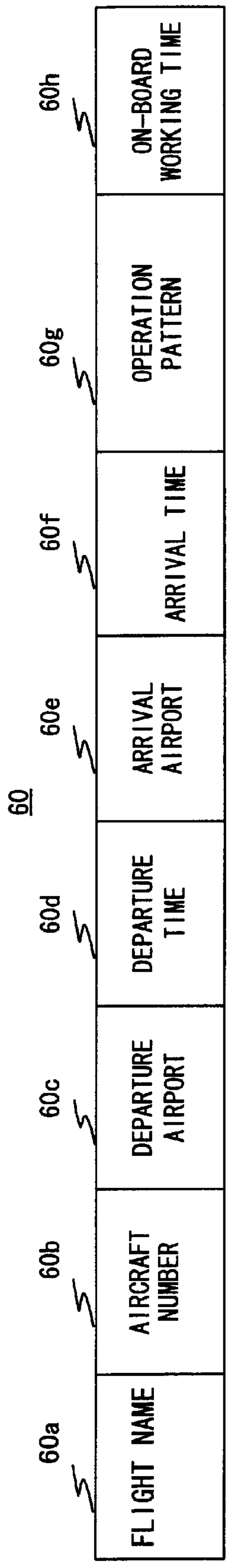
FIG. 12 shows the data structure of a record except for the segment connection probability table shown in FIG. 11.

FIGS. 11 and 12 show the data structures of the connection table generated in step S23.

FIG. 11 shows the entire configuration of the connection table.

As shown in this figure, the connection table 50 is composed of target flight information 50*a*, information of the next connecting flight by the same aircraft 50*b*, same-day connecting flight information 50*c*, same-day deadhead information 50*d*, information of a next-day flight to be worked 50*e*, next-day connecting flight information 50*f*, next-day deadhead information 50*g*, a segment connection probability table 50*h*, departure information from a base airport 50*i*, and arrival information at a base airport 50*j*.

FIG. 12 shows the data structure of the above described information items 50*a* through 50*j* except for the segment connection probability table 50*h*.

As shown in this figure, these information items are stored in the connection table 50 as a record 60 composed of respective fields such as a flight name 60*a*, a departure airport 60*c*, a departure time 60*d*, an arrival airport 60*e*, an arrival time 60*f*, an operation pattern 60*g*, and on-board working hours 60*h*. The operation pattern 60*g* is structured, for example, by a binary string of 31 bits representing an operation schedule for one month. In this case, "1" indicates an operation day, whereas "0" indicates a non-operation day.

Figure 13:
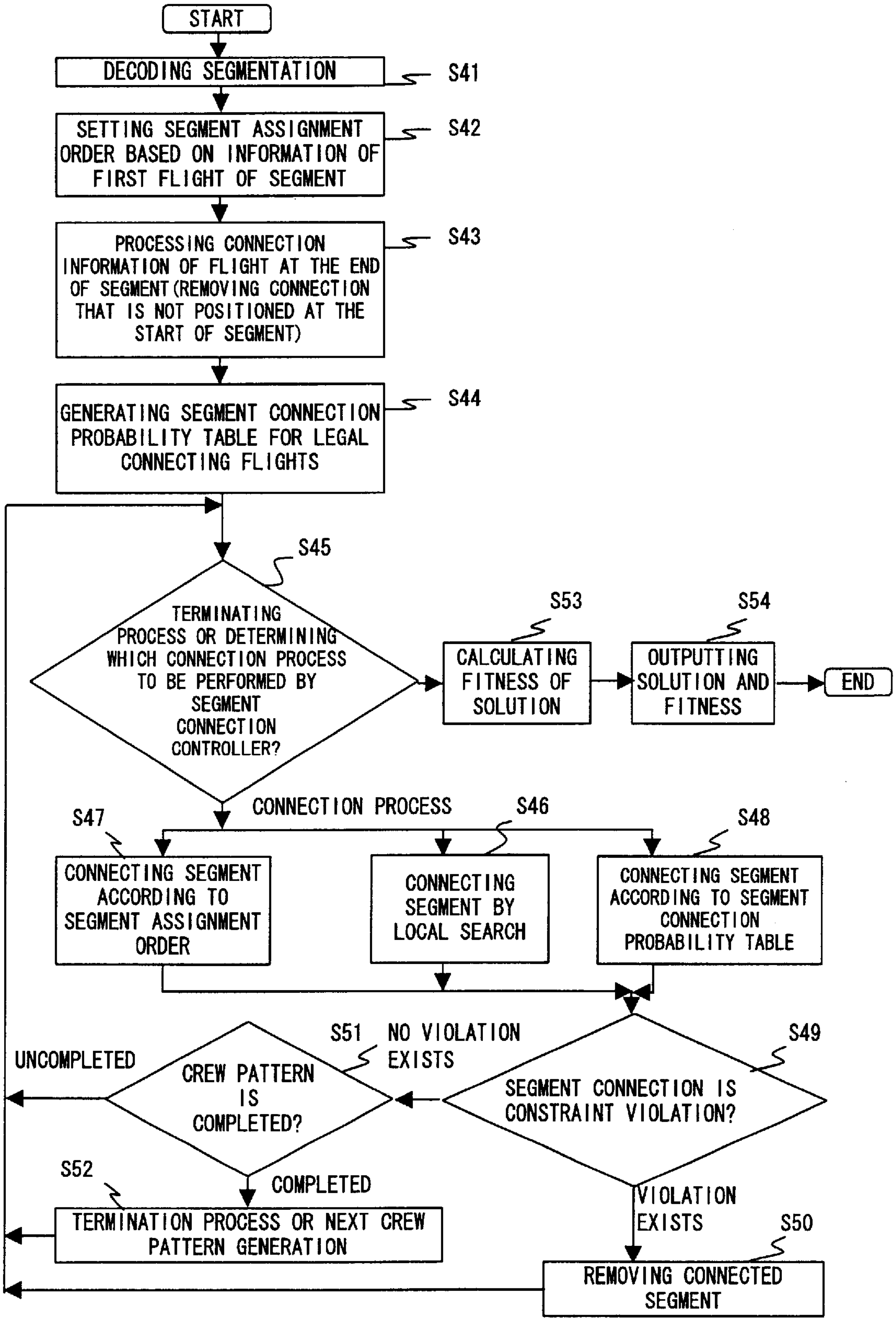
FIG. 13 is a flowchart showing the process generating a solution with a chromosome.

FIG. 13 explains the entire flow of the solution generation process (the process generating a plurality of crew patterns) performed by the optimizer 22 according to this preferred embodiment. Note that this flowchart explains the solution generation process with one chromosome 2-1 (chromosome 40).

First of all, segmentation information of the respective ship lines of the gene 43 in the chromosome 40 are decoded by using their corresponding segmentation probability tables (step S41). As a result, the respective ship lines registered to the gene 43 are partitioned into one or a plurality of segments according to their segmentation information.

Next, the value of the gene 41 of the first flight in each segment obtained in step S41 is referenced, the above described first flight sorting process is performed, and an assignment order of the segments is set (step S42). That is, a higher assignment order is set for a segment including the first flight with a higher sorting order.

Figure 14:
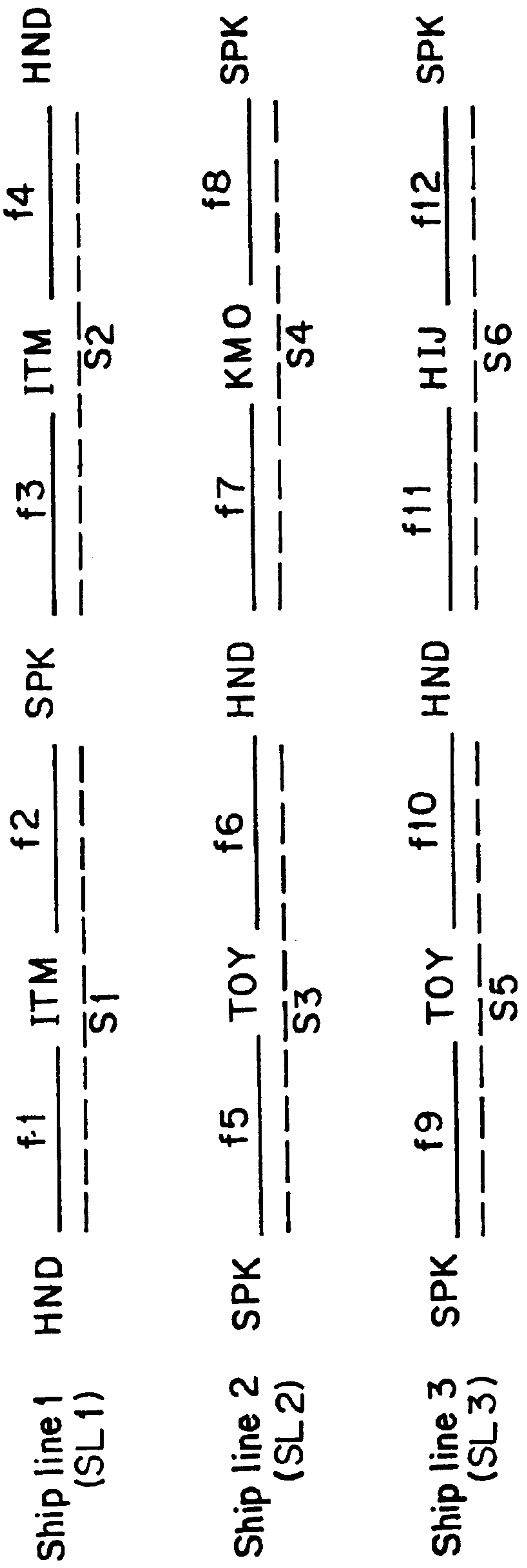
FIG. 14 exemplifies the ship lines 1 through 3.
Figure 16:
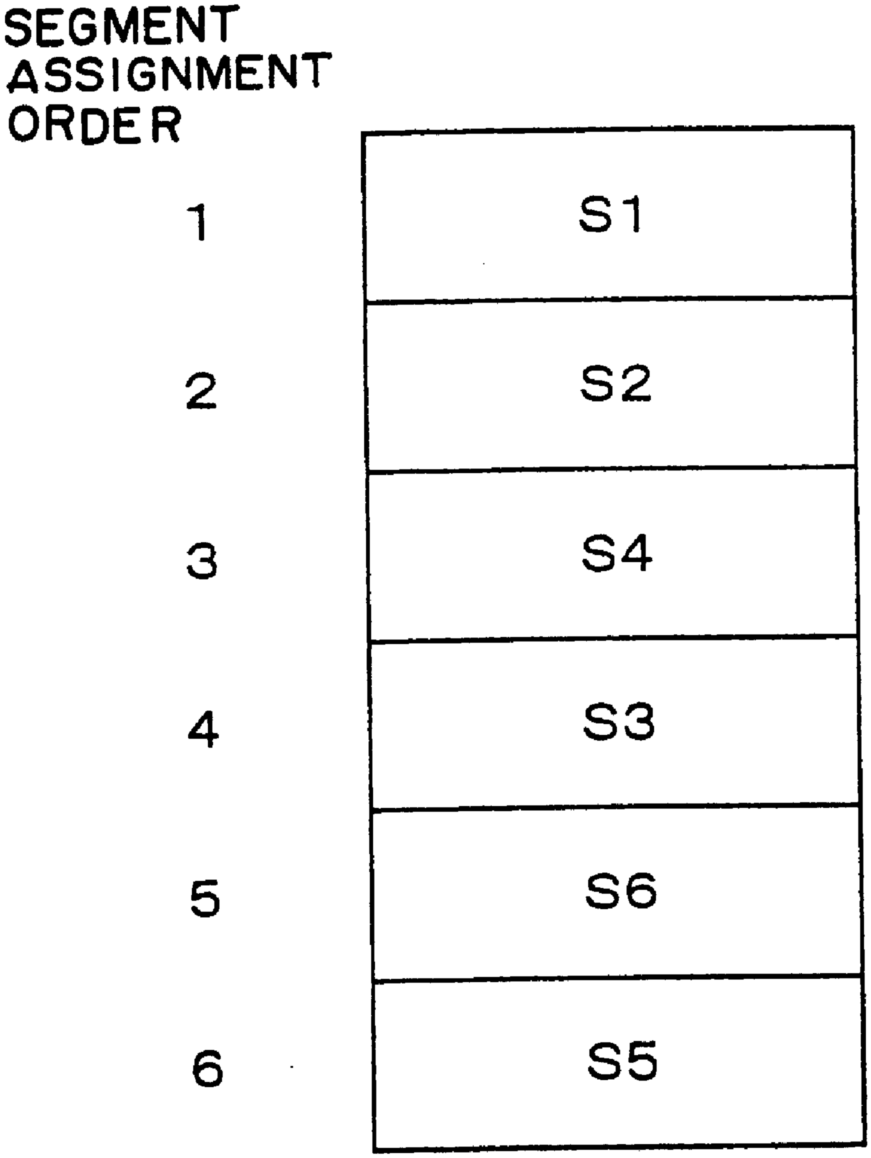
FIG. 16 shows a segment assignment order obtained based on the sorting result shown in FIG. 15.

Assume that the ship lines 1 through 3 shown in FIG. 6 are partitioned into segments as indicated by broken lines in FIG. 14, by means of the segmentations of the ship lines 1 (SL1) through 3 (SL3) of the gene 42 in the chromosome 40. Namely, it is assumed that the ship lines 1, 2, and 3 are respectively partitioned into the segments S1 and S2, the segments S3 and S4, and the segments S5 and S6. In this case, the gene 41 is referenced, and a sorting result (f1, f3, f7, f5, f11, f9) shown in FIG. 15 is obtained. Then, an assignment order of the segments (S1, S2, S4, S3, S6, S5) is finally set as shown in FIG.16.

Then, the connection information of the flight at the end of each segment is processed when the segment connection is started. This process is a process removing connections (connecting flights) that are not positioned at the beginning of each segment (step S43). In this way, legal connecting flights can be obtained. For example, if the ship line shown in FIG. 7A is partitioned by the segmentation S12, legal connecting flights are f2 and f4.

Next, a segment connection probability table is individually generated for all of the legal connecting flights obtained in step S43 (step S44).

FIG. 17 exemplifies the segment connection probability table for the legal connecting flight f2, when the above described ship line 1 shown in FIG. 7A is segmented by the segmentation S12.

The segment connection probability table 70 for the flight f2, which is shown in FIG. 17, depicts the probabilities of connections to f3, f5, and f9, and connections of f5→f6, f5→f10, f9→f6, and f9→f10. In this case, f3 is a connection not to be operated on the same day after a same-day deadhead (its connection probability is 0.20). Additionally, f3 and f5 are connections to be operated next day (their connection probabilities are respectively 0.30 and 0.20). f5→f6, f5→f10, F9→f6, and f9→f10 are connections to be operated on the next day after a next-day deadhead (their connection probabilities are respectively 0.10, 0.05, 0.05, and 0.10). The generation of the segment connection probability table in step S44 is a process for rebuilding a segment connection probability table, which is performed based on the segment connection probability table 50*h* obtained in the pre-process, an already generated crew pattern, etc.

As described above, the decoding process in steps S41 through S44 is performed by the decoding unit 3 of the GA execution unit 22*a*.

Next, the solution generation process is started by the crew pairing model calculation unit 22*b*.

In this case, the segment connection controller (not shown) arranged within the crew pairing model calculation unit 22*b* extracts the first segment according to the result of the segment assignment order obtained in step S42, and starts to generate a crew pattern beginning with this segment. Additionally, the segment connection controller performs any of the processes in steps S46 through S48 according to the following determination criteria.

(1) If a through-days (regular) segment becomes irregular, a segment is connected by a local search in step S46.

(2) If connecting flight candidate information which is still unused and not included in a crew pattern currently remains in the gene 43 of the segment to be processed, the segment is connected according to that information.

(3) If no available connecting flight candidate information currently remains in the gene 43 of the segment to be processed, the segment is connected in step S48 by using the segment connection probability table generated in step S44.

The segment connection probability table makes the above described determinations (1) through (3) in this order, and determines the step to be executed.

In step S46, the local search method unit 4-2 searches for an optimum segment to be connected to the flight at the end of the current crew pattern among unconnected segments by a local search, and connects that segment to the flight at the end of the crew pattern.

In step S47, the GA search unit 4-3 determines the segment to be connected to the flight at the end according to the connecting flight candidate list of the gene 43 of the flight at the end of the crew pattern generated so far.

In step S48, the stochastic search unit 4-4 determines the segment to be connected to the flight at the end of the crew pattern generated so far according to the segment connection probability table generated in step S44. The segment connection probability table used at this time is the segment connection probability table of the flight at the end.

When a new segment connection is made with any of the above described processes in steps S46 through S48, the constraint violation determination unit 4-5 determines whether or not this segment connection is a constraint violation (step S49).

If the connection is a constraint violation, the constraint violation processing unit 4-6 removes the segment connected in step S46, S47, or S48 from the current crew pattern (sep S50), and the process goes back to step 45.

If the segment connection is not a constraint violation in step S49, it is determined whether or not the crew pattern is completed (step S51).

The completion condition of a crew pattern are, for example, as follows.

(1) "−1" (forcible termination) is decoded during the decoding of the gene 43 in step S47.

(2) The probability that the flight at the end of a crew pattern can return to a base airport on a same day is 95 percent.

If the crew pattern is determined not to be completed in step S51, the process goes back to step S45 and the connection process for the next segment is started.

If the crew pattern is determined to be completed in step S51, a termination process such as a registration of this crew pattern as part of the solution, etc. is performed. The process then goes back to step S45 in order to transfer to the generation process for the next crew pattern.

By repeating the loop process in steps S45 through S52 as described above, a plurality of crew patterns are generated one after another, and a solution is generated. When determining the termination of the process in step S45, the segment connection controller to outputs the solution obtained so far to the solution/fitness calculation unit 4-7, and transfers the right to execute the process to the solution/fitness calculation unit 4-7.

The solution/fitness calculation unit 4-7 calculates the fitness of the solution received from the segment connection controller (step S53), outputs the solution 2-2 and the fitness 2-3 of the chromosome 2-1 (chromosome 40) used in the processing at this time to the chromosome group 2 (step S54). The process is then terminated.

FIGS. 18 through 21 specifically explain the procedures for generating a crew pattern (solution 202) by executing the process of the flowchart shown in FIG. 13.

Figure 18:
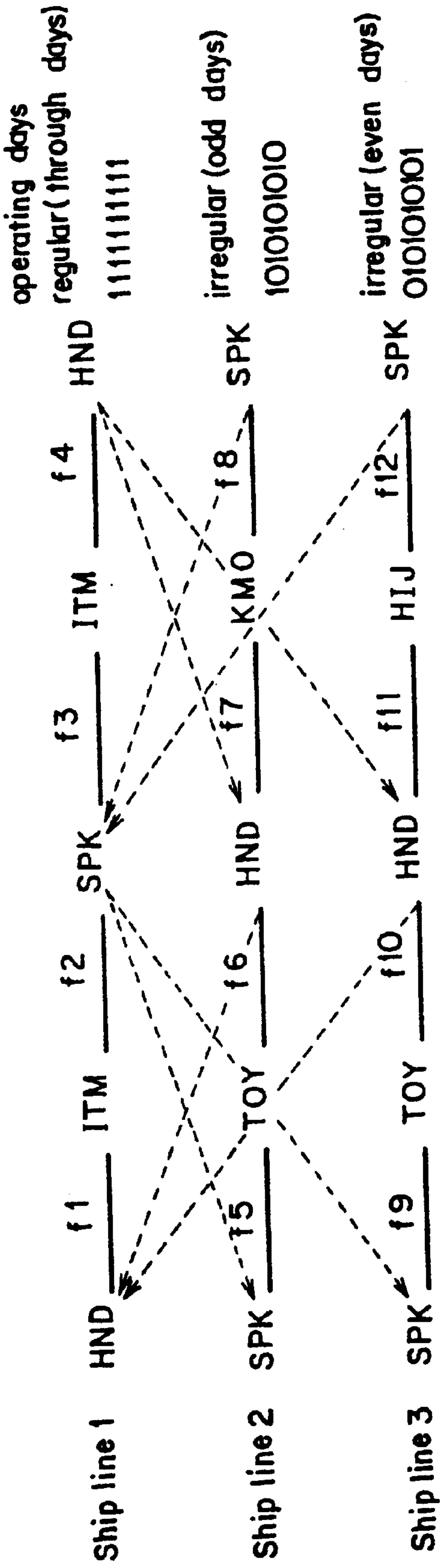
FIG. 18 shows a specific example of the ship lines 1 through 3.

The following explanation refers to an example where crew patterns are generated for the ship lines 1 through 3 shown in FIG. 18. Since the ship lines 1 through 3 shown in FIG. 18 are the same as those shown in FIG. 6, details of the ship lines such as their structures, etc. are omitted here.

Figure 19:
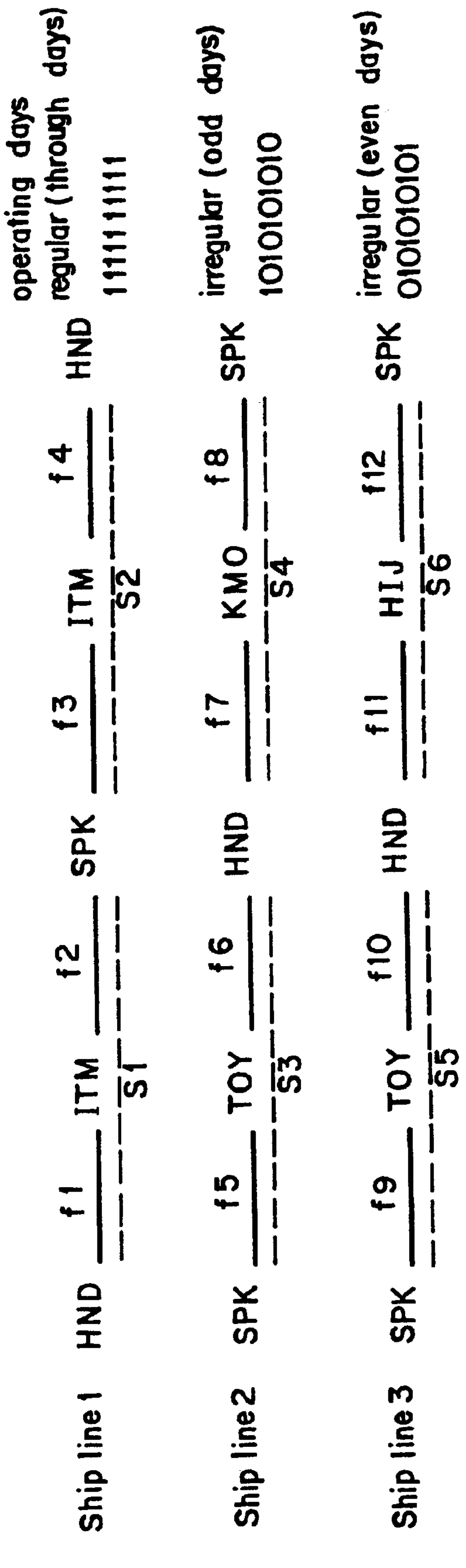
FIG. 19 shows the result of partitioning the ship lines 1 through 3 shown in FIG. 18 into segments, which is obtained by decoding the chromosome shown in FIG. 9 with the segmentation probability table shown in FIG. 7.

Initially, assume that all of the ship lines 1 through 3 are partitioned into segments as shown in FIG. 19 by decoding the gene 42 in the chromosome 40 with reference to the respectively corresponding segmentation probability tables 30*a* through 30*c* shown in (a) through (c) in FIG. 7. Namely, the ship line 1 is assumed to be partitioned into the segment S1 connecting the flights f1 and f2, and the segment S2 connecting the flights f3 and f4. Similarly, as shown in FIG. 19, the ship line 2 is assumed to be partitioned into the segment S3 connecting the flights f5 and f6, and the segment S4 connecting the flights f7 and f8, and the ship line 3 is assumed to be partitioned into the segment S5 connecting the flights f9 and f10, and the segment S6 connecting the flights f11 and f12.

Next, the segment connection controller starts to generate a crew pattern which begins with the segment S1 as a result of the decoding of the gene 41 (refer to FIG. 16). At this time, the first flight f9 of the segment S5 is supposed to be specified as the first connecting flight candidate in the gene 43 (43-2) of the flight f2 at the end of the segment S1, although this is not shown in FIG. 9. According to this specification, the segments S1 and S5 are connected as indicated by a solid line arrow 1 shown in FIG. 20 (step S47). If this segment connection is not a constraint violation, the flight at the end of the segment S5 is the flight f10 which arrives at the base airport (HND). Therefore, the generation of the first crew pattern (S1→S5) is terminated. Because the segment S5 is an irregular operation (01010101) on odd days, the remaining operation of the segment S1 results in an irregular operation on even days.

Figure 20:
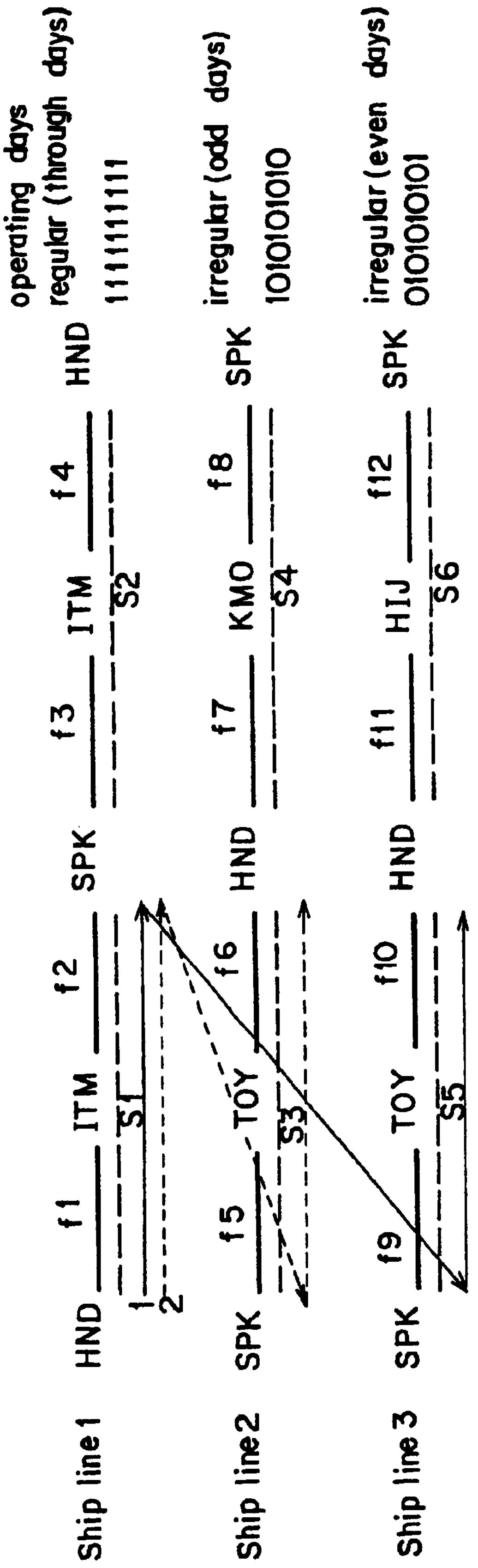
FIG. 20 explains the procedures for generating first and second crew patterns by applying the decoding result of the chromosome shown in FIG. 9 and a local search method to the segment partitioning result shown in FIG. 19.

Next, a local search is started by the local search method unit 4-2 due the above described operation irregularity. Here, suppose that the segment S3 which is an irregular operation on even days is found as a connection destination of the segment S1 (step S46). In this case, the segments S1 and S3 are connected as indicated by a broken line arrow 2 shown in FIG. 20. If this segment connection is not a constraint violation, the flight at the end of the segment S3 is the flight f6 which arrives at the base airport (HND). Therefore, the second crew pattern (S1→S3), which is indicated by the broken line arrow 2 shown in FIG. 20, is generated.

With the above described process, all of the operation days of the segment S1 are included in the above described first and second crew patterns. Accordingly, the generation process of crew patterns, which begin with the segment S1, is terminated.

Next, the segment connection controller starts to generate crew patterns which begin with the segment S2 according to the segment assignment order shown in FIG. 16.

Since the segment S2 includes no deadhead from the base airport (only HND (Haneda) is assumed to be specified as the base airport in this case), the segment S2 cannot become the start of a crew pattern. Therefore, the next segment which can become the start is searched.

Figure 21:
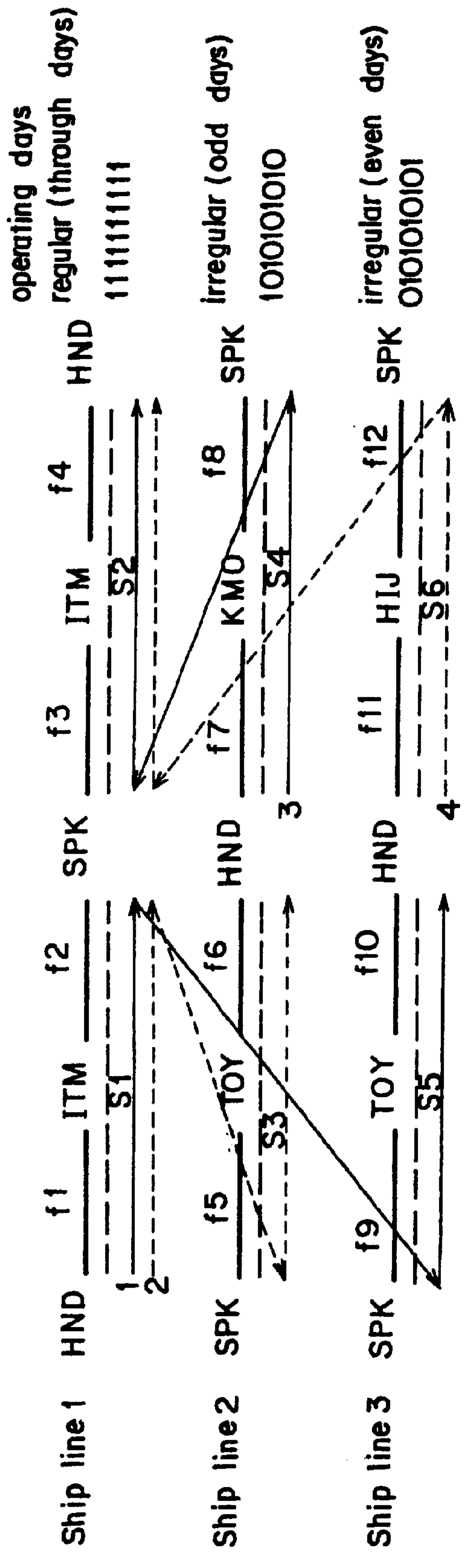
FIG. 21 explains the procedures for generating third and fourth crew patterns by applying the decoding result of the chromosome shown in FIG. 9 and the local search method, after the process shown in FIG. 20 is performed.

As a result of the search, the segment S4 is found as the next segment which can possibly become the start, according to the assignment order shown in FIG. 16. The remaining segment that can be connected to the segment S4 is the segment S2 at this time point. Therefore, the segments S4 and S2 are connected as indicated by a solid line arrow 3 shown in FIG. 21 (step S46). If this segment connection is not a constraint violation, the flight at the end of the segment S2 is the flight f4 which arrives at the base airport (HND). Therefore a third crew pattern (S4→S2), which is indicated by the solid line arrow 3 shown in FIG. 21, is generated (step S46).

As a result of the generation of the third crew pattern, the remaining operation of the segment S2 result in an irregular operation on even days. The segment connection controller therefore invokes the local search method unit 4-2, which searches for a segment that complements the irregular segment S2 by a local search. As a result of the search, the segment S6 which is an irregular operation on even days in a pattern similar to the segment S2 is searched as a segment to be connected to the segment S2. The segments S2 and S6 are then connected as indicated by a broken line arrow 4 shown in FIG. 21 (step S46). If this segment connection is not a constraint violation, the flight at the end of the segment 6 is the flight f12 which arrives at the base airport (HND). Therefore, the fourth crew pattern (S6→S2), which is indicated by the broken line arrow 4 shown in FIG. 21, is generated.

With the above described process, all of the operation days of the segment S2 are included in the above described third and fourth crew patterns. The generation process of crew patterns which begin with the segment S2 is therefore terminated.

Consequently, the operation days of all of the segments S1 through S6 are included in the first to fourth crew patterns. Here, the entire generation process of crew patterns is completed.

Notice that the stochastic search unit 4-4 is not used in the example shown in FIGS. 19 and 20. However, if no suitable segment can be found by the local search method unit 4-2 and the GA search unit 4-3, the segment connection controller invokes the stochastic search unit 4-4, which makes a segment connection.

The above described preferred embodiment is an example in which the present invention is applied to a crew pattern generating apparatus. However, the present invention is not limited to this implementation, and is applicable to all of optimizing apparatuses solving a constraint satisfying optimization problem, etc.

Figure 22:
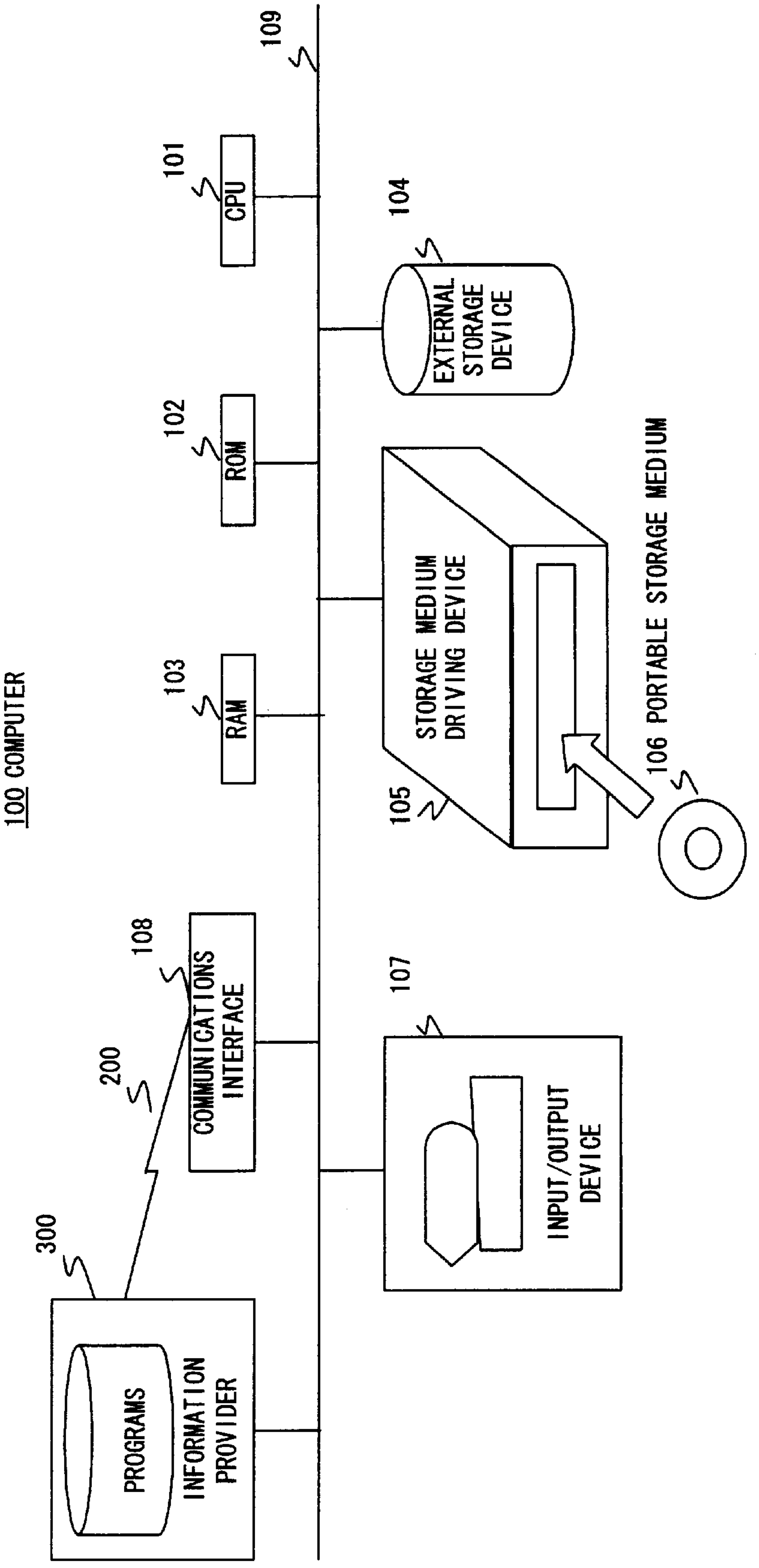
FIG. 22 exemplifies the hardware configuration of a computer implementing the preferred embodiment.

FIG. 22 shows the hardware configuration of a computer which implements the preferred embodiment of the present invention.

In this figure, a CPU 101 is connected to a ROM 102, a RAM 103, an external storage device 104, a storage medium driving device 105, an input/output device 107, and a communications interface 108 via a bus 109.

The CPU 101 implements the capabilities of the optimizing apparatus according to the above described preferred embodiment by executing programs stored in the ROM 102 and programs loaded into the RAM 103. The external storage device 104 stores the above described programs loaded into the RAM 103, the above described files 13 and 14, etc.

The external storage device 104 is, for example, a magnetic disk device, an optical disk device, etc. A portable storage medium 106 storing the above described programs is inserted into the storage medium driving device 105. The programs stored onto the portable storage medium 106 are read by the storage medium driving device 105, loaded into the RAM 103, and executed by the CPU 101. The capabilities of the optimizing apparatus according to the above described preferred embodiment are implemented by this execution.

The communications interface 108 downloads the above described programs possessed by an information provider 300 into the external storage device 104 via a network 200. Thus downloaded programs are read from the external storage device 104, expanded in the RAM 103, and executed by the CPU 101. The capabilities of the optimizing apparatus according to the above described preferred embodiment are implemented by this execution.

Additionally, it is possible to make a computer possessed by the information provider 300 remotely execute the above described programs, and to cause the computer to implement the capabilities of the optimizing apparatus according to the above described preferred embodiment. In such an embodiment, a solution is received by a computer 100, and output via the input/output device 107.

The input/output device 107 provides a user with an environment for causing the CPU 101 to run the constraint condition editor 11 and the crew pairing editor 12, which are stored in the external storage device 104, etc., via a GUI, etc. A user is made to generate and edit the files 13 and 14 by using these editors 11 and 12. The input/output device 107 outputs (displays, prints, etc.) a solution obtained by executing the above described programs, and the like.

The portable storage medium 106 is a storage medium that can be inserted into the storage medium driving device 105 for a magnetic disk, an optical disk, a CD (Compact Disk) of various standards, a DVD (Digital Versatile Disk) of various standards, a PC card, etc, and can be distributed to users by using various distribution forms.

The network 200 is the Internet, an intranet, an extranet, a VPN (Virtual Private Network), a public line, a dedicated line, a wireless line, a satellite line, a CATV (CAble TeleVision) line, a LAN, a MAN, a WAN, etc.

As described above, according to the present invention, the following effects can be obtained.

1) A schedule of a model (fully dated model) over a long time period, which cannot be handled by conventional techniques at all and includes irregular operations, can be processed.

2) Since a pre-process and a post-process, which are required for an individual process, are automatically added by a problem model at the stage of solution generation, handling of a deadhead, etc., can be implemented in a unified manner if the present invention is applied to the generation of an aircraft crew pattern.

3) A problem which has an extensive search space can efficiently be searched, and a search time can significantly be reduced. Additionally, a search based on heuristics, a stochastic search, and rules can be implemented in balance. A solution of high quality can be derived in a short time also to a combinatorial problem on which many constraint conditions are imposed.

4) If the present invention is applied to the generation of an aircraft crew schedule, a schedule, which conventionally requires one week to be made manually by an expert having several years of practical experience, can automatically be generated in approximately half a day.

What is claimed is:

1. An optimizing apparatus, comprising:

a solution-seeking data presenting unit outputting solution-seeking data represented by a chromosome to a problem model, advancing optimization of the solution-seeking data by receiving, as a fitness of the chromosome, an evaluation value of a solution obtained by applying the solution-seeking data to the problem model, and evolving the chromosome with a genetic algorithm;

a solution seeking unit obtaining a solution-seeking starting point of a solution to the problem model from the solution-seeking data received from said solution-seeking data presenting unit by using a first probability table storing information for stochastically determining the solution-seeking starting point, when decoding a first gene of the chromosome, and seeking a solution to the problem model by using both a local search method and a stochastic search method;

an evaluation value calculating unit calculating an evaluation value of the solution obtained by said solution seeking unit, and outputting the evaluation value to said solution-seeking data presenting unit; and a solution obtaining unit obtaining a final solution to the problem model by controlling said solution-seeking data presenting unit, said solution seeking unit, and said evaluation value calculating unit.

2. The optimizing apparatus according to claim 1, wherein said solution seeking unit comprises a second probability table storing information for stochastically determining a next search point, and advances solution seeking with a stochastic search method by decoding a second gene of the chromosome while using the second probability table.

3. The optimizing apparatus according to claim 1, wherein:

the problem model is a constraint satisfying optimization problem model seeking a solution to a second schedule over a plurality of days, which is obtained by connecting a plurality of first schedules, each composed of a sequence of operations in certain units for each day; and the problem-seeking starting point is an operation that is initially started at the beginning of the second schedule.

4. The optimizing apparatus according to claim 3, wherein:

the operations are aircraft flight operations, the first schedule is a crew pattern on one day, and the second schedule is a crew pattern over a plurality of days;

the local search method is used to search for a connecting flight that can be operated on an operation day except for an irregular flight day;

the stochastic search method is used to search for a flight to be connected next;

said solution seeking unit generates the crew pattern by partitioning a ship line into segments based on the solution-seeking data, and by connecting the partitioned segments;

partitioning of the segments is made by using a segmentation probability table which is arranged for each ship line and stores a segmentation method of each ship line; and a connection of the partitioned segments is made by a stochastic search using a segment connection probability table which is arranged for each flight and stores connection probability information of a flight to be connected to each flight.

5. The optimizing apparatus according to claim 4, wherein:

said solution-seeking data presenting unit obtains the solution-seeking data in a form of a chromosome by using a genetic algorithm;

said solution seeking unit generates a crew pattern by partitioning each ship line into segments with a first gene of the chromosome, and the segmentation probability table which is arranged for each ship line and stores information for stochastically determining a segmentation method of each ship line, and by connecting the partitioned segments, and at the same time, said solution seeking unit stochastically searches for a segment to be connected next with a second gene of the chromosome, and the segment connection probability table which is arranged for each flight and stores a connection probability value of a flight to be connected to each flight.

6. An optimizing method seeking a final solution to a problem model, comprising:

outputting solution-seeking data represented by a chromosome to a problem model;

advancing optimization of the solution-seeking data by receiving, as a fitness of the chromosome, an evaluation value of a solution obtained by applying the solution-seeking data to the problem model;

evolving the chromosome with a genetic algorithm;

obtaining a solution-seeking starting point of a solution to the problem model from the solution-seeking data by using a first probability table storing information for stochastically determining the solution-seeking starting point, when decoding a first gene of the chromosome, and seeking a solution to the problem model by using at least both of a local search method and a stochastic search method; and calculating an evaluation value of the obtained solution, and using the evaluation value to advance optimization of the solution-seeking data.

7. The optimizing method according to claim 6, further comprising advancing solution seeking with a stochastic search method by decoding a second gene of the chromosome while using a second probability table storing information for stochastically determining a next search point.

8. The optimizing method according to claim 6, wherein the problem model is a constraint satisfying optimization problem model seeking a solution to a second schedule over a plurality of days, which is obtained by connecting a plurality of first schedules, each composed of a sequence of operations in certain units for each day; and the problem-seeking starting point is an operation that is initially started at the beginning of the second schedule.

9. The optimizing method according to claim 8, wherein:

the operations are aircraft flight operations, the first schedule is a crew pattern on one day, and the second schedule is a crew pattern over a plurality of days;

the local search method is used to search for a connecting flight that can be operated on an operation day except for an irregular flight day;

the stochastic search method is used to search for a flight to be connected next;

the crew pattern is generated by partitioning a ship line into segments based on the solution-seeking data, and by connecting the partitioned segments;

partitioning of the segments is made by using a segmentation probability table which is arranged for each ship line and stores a segmentation method of each ship line; and a connection of the partitioned segments is made by a stochastic search using a segment connection probability table which is arranged for each flight and stores connection probability information of a flight to be connected to each flight.

10. The optimizing method according to claim 9, further comprising:

obtaining the solution-seeking data in a form of a chromosome by using a genetic algorithm;

generating a crew pattern by partitioning each ship line into segments with a first gene of the chromosome, and the segmentation probability table which is arranged for each ship line and stores information for stochastically determining a segmentation method of each ship line, and by connecting the partitioned segments, and at the same time, stochastically searching for a segment to be connected next with a second gene of the chromosome, and the segment connection probability table which is arranged for each flight and stores a connection probability value of a flight to be connected to each flight.

11. A computer-readable storage medium on which is recorded a program for causing a computer to execute a process, said process comprising:

outputting solution-seeking data represented by a chromosome to a problem model;

advancing optimization of the solution-seeking data by receiving, as a fitness of the chromosome, an evaluation value of a solution obtained by applying the solution-seeking data to the problem model;

evolving the chromosome with a genetic algorithm;

obtaining a solution-seeking starting point of a solution to the problem model from the solution-seeking data by using a first probability table storing information for stochastically determining the solution-seeking starting point, when decoding a first gene of the chromosome, and seeking a solution to the problem model by using at least both of a local search method and a stochastic search method; and calculating an evaluation value of the obtained solution, and using the evaluation value to advance optimization of the solution-seeking data.

12. The storage medium according to claim 11, wherein said process further comprising:

advancing solution seeking with a stochastic search method by decoding a second gene of the chromosome while using a second probability table storing information for stochastically determining a next search point.

13. The storage medium according to claim 11, wherein:

the problem model is a constraint satisfying optimization problem model seeking a solution to a second schedule over a plurality of days, which is obtained by connecting a plurality of first schedules, each composed of a sequence of operations in certain units for each day; and the problem-seeking starting point is an operation that is initially started at the beginning of the second schedule.

14. The storage medium according to claim 13, wherein:

the operations are aircraft flight operations, the first schedule is a crew pattern on one day, and the second schedule is a crew pattern over a plurality of days;

the local search method is used to search for a connecting flight that can be operated on an operation day except for an irregular flight day;

the stochastic search method is used to search for a flight to be connected next;

the crew pattern is generated by partitioning a ship line into segments based on the solution-seeking data, and by connecting the partitioned segments;

partitioning of the segments is made by using a segmentation probability table which is arranged for each ship line and stores a segmentation method of each ship line; and a connection of the partitioned segments is made by a stochastic search using a segment connection probability table which is arranged for each flight and stores connection probability information of a flight to be connected to each flight.

15. The storage medium according to claim 14, wherein said process further comprising:

obtaining the solution-seeking data in a form of a chromosome by using a genetic algorithm;

generating a crew pattern by partitioning each ship line into segments with a first gene of the chromosome, and the segmentation probability table which is arranged for each ship line and stores information for stochastically determining a segmentation method of each ship line, and by connecting the partitioned segments, and at the same time, stochastically searching for a segment to be connected next with a second gene of the chromosome, and the segment connection probability table which is arranged for each flight and stores a connection probability value of a flight to be connected to each flight.

* * * * *